US010054663B2

(12) United States Patent
Katz

(10) Patent No.: US 10,054,663 B2
(45) Date of Patent: Aug. 21, 2018

(54) SINGLE BURST SINGLE SATELLITE BEACON LOCALIZATION

(71) Applicant: Daniel A. Katz, Kiryat Ono (IL)

(72) Inventor: Daniel A. Katz, Kiryat Ono (IL)

(73) Assignee: Daniel A. Katz, Kiryat Ono (IL)

( * ) Notice: Subject to any disclaimer, the term of this patent is extended or adjusted under 35 U.S.C. 154(b) by 410 days.

(21) Appl. No.: 15/205,001

(22) Filed: Jul. 8, 2016

(65) Prior Publication Data

US 2018/0095156 A1 Apr. 5, 2018

(51) Int. Cl.
| | |
|---|---|
| *H04M 11/04* | (2006.01) |
| *G01S 5/02* | (2010.01) |
| *G01S 19/17* | (2010.01) |
| *G01S 1/68* | (2006.01) |
| *G01S 19/02* | (2010.01) |
| *G01S 19/25* | (2010.01) |
| *B63C 9/00* | (2006.01) |

(52) U.S. Cl.
CPC ............ *G01S 5/0231* (2013.01); *G01S 1/685* (2013.01); *G01S 5/0273* (2013.01); *G01S 19/02* (2013.01); *G01S 19/17* (2013.01); *G01S 19/252* (2013.01); *B63C 2009/0017* (2013.01)

(58) Field of Classification Search
CPC ...... G01S 5/0231; G01S 5/0273; G01S 19/02; G01S 19/252; G01S 19/17; B63C 2009/0017
See application file for complete search history.

(56) References Cited

U.S. PATENT DOCUMENTS

| | | | | |
|---|---|---|---|---|
| 4,630,289 | A | * | 12/1986 | Wren .................... G08B 25/016 340/539.1 |
| 2002/0175853 | A1 | * | 11/2002 | Peeters ...................... G01S 5/06 342/353 |
| 2016/0003933 | A1 | * | 1/2016 | Calmettes ............. G01S 5/0072 342/357.25 |
| 2017/0199266 | A1 | * | 7/2017 | Rice ....................... G01S 5/0231 |

* cited by examiner

*Primary Examiner* — Barry W Taylor

(57) ABSTRACT

A method and devices are disclosed, for localization of a radio beacon at a remote receiver in the framework of a satellite system. Such satellite system could be Cospas-Sarsat, for Search and Rescue of people, ships and aircraft in distress, and particularly its MEOSAR (Medium Earth Orbit Search and Rescue) segments: DASS/GPS, SAR/Galileo and SAR/Glonass; said beacon is typically one of a PLB (Personal Locator Beacon) or EPIRB (Emergency Position Indicating Radio Beacon) or ELT (Emergency Locator Beacon); and said remote receiver is typically a MEOLUT (Medium Earth Orbit Local User Terminal) base station.

Present art MEOSAR localization is based on Time measurements and Frequency measurements on signals emitted by radio beacons, relayed by satellites and detected at a MEOLUT; however since the exact time of transmission of the beacon is unknown at the MEOLUT, Time Difference of Arrival (TDOA) equations are applied. The present invention however, discloses that by carefully configuring the time of transmission at said beacon, even without directly communicating that specific time to the MEOLUT, Time of Arrival (TOA) equations could be applied at the MEOLUT enabling enhanced localization accuracy and/or fewer satellites in view required to localize the beacon. In particular, localization is enabled even upon a single burst emitted by the beacon and relayed to the MEOLUT by a single satellite.

20 Claims, 10 Drawing Sheets

FIG.1 – Beacon Localization based on TOA
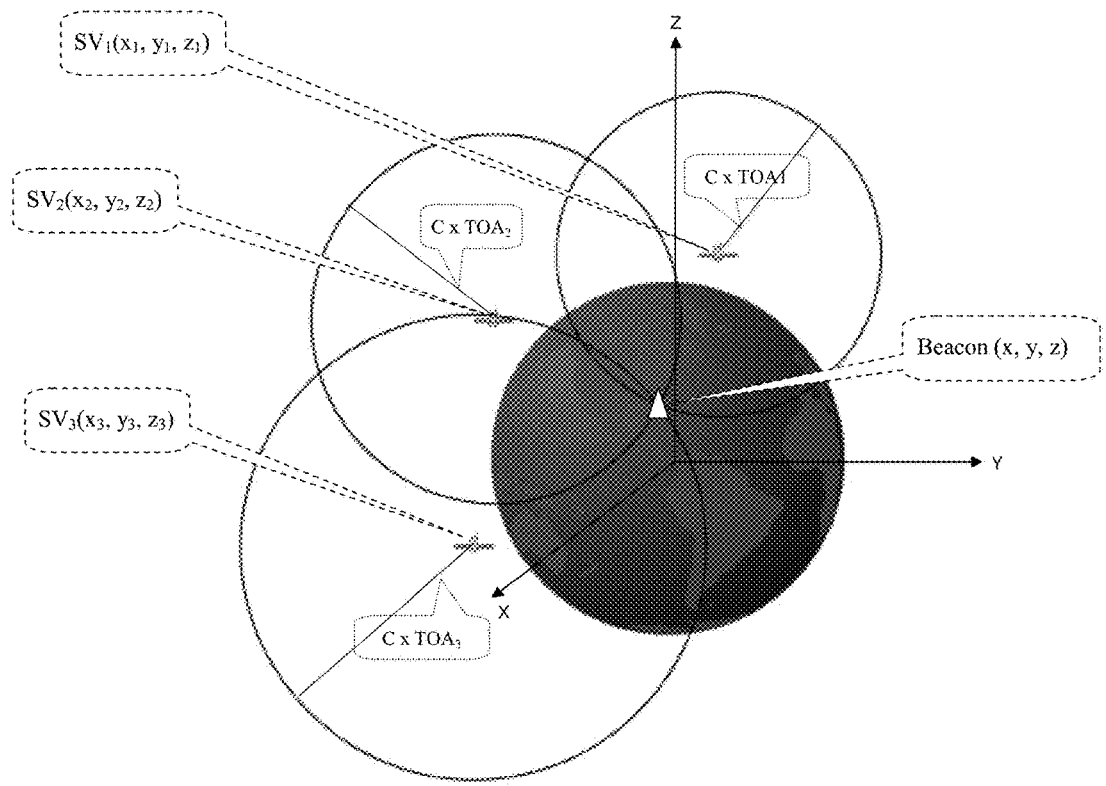
$$\sqrt{[(x-x_1)^2 + (y-y_1)^2 + (z-z_1)^2]} = C \times TOA_1 = C \times (tr_1 - tx)$$
$$\sqrt{[(x-x_2)^2 + (y-y_2)^2 + (z-z_2)^2]} = C \times TOA_2 = C \times (tr_2 - tx)$$
$$\sqrt{[(x-x_3)^2 + (y-y_3)^2 + (z-z_3)^2]} = C \times TOA_3 = C \times (tr_3 - tx)$$

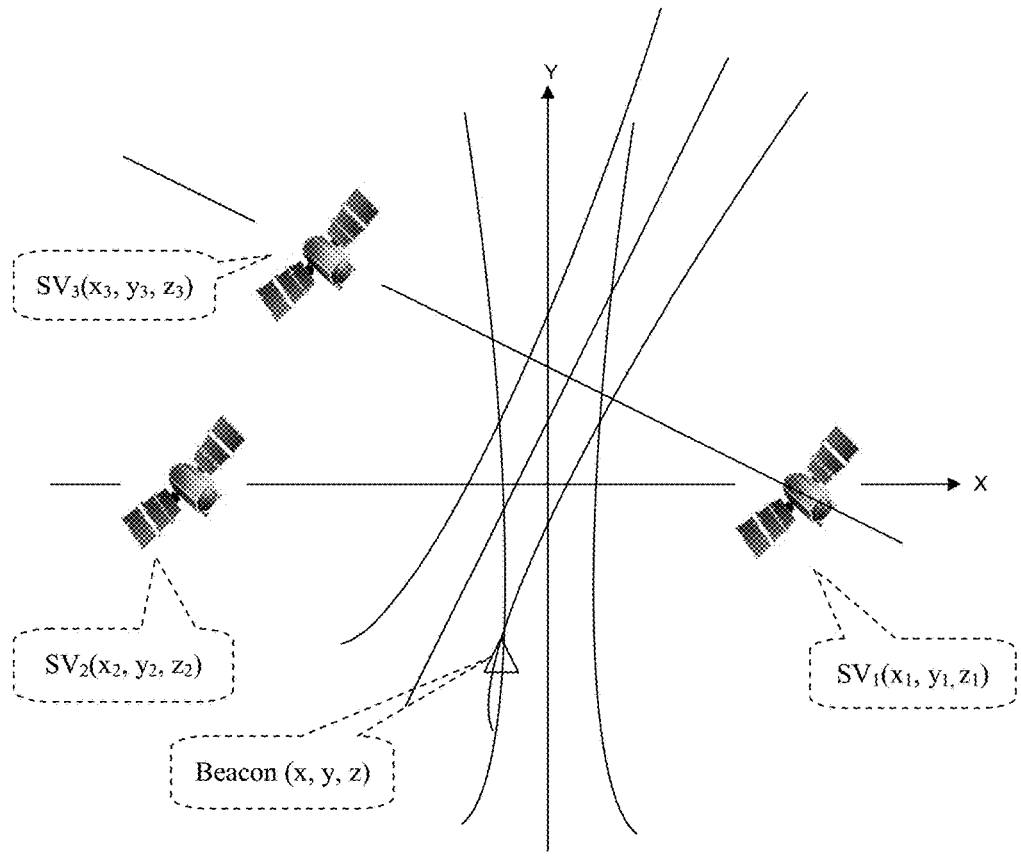

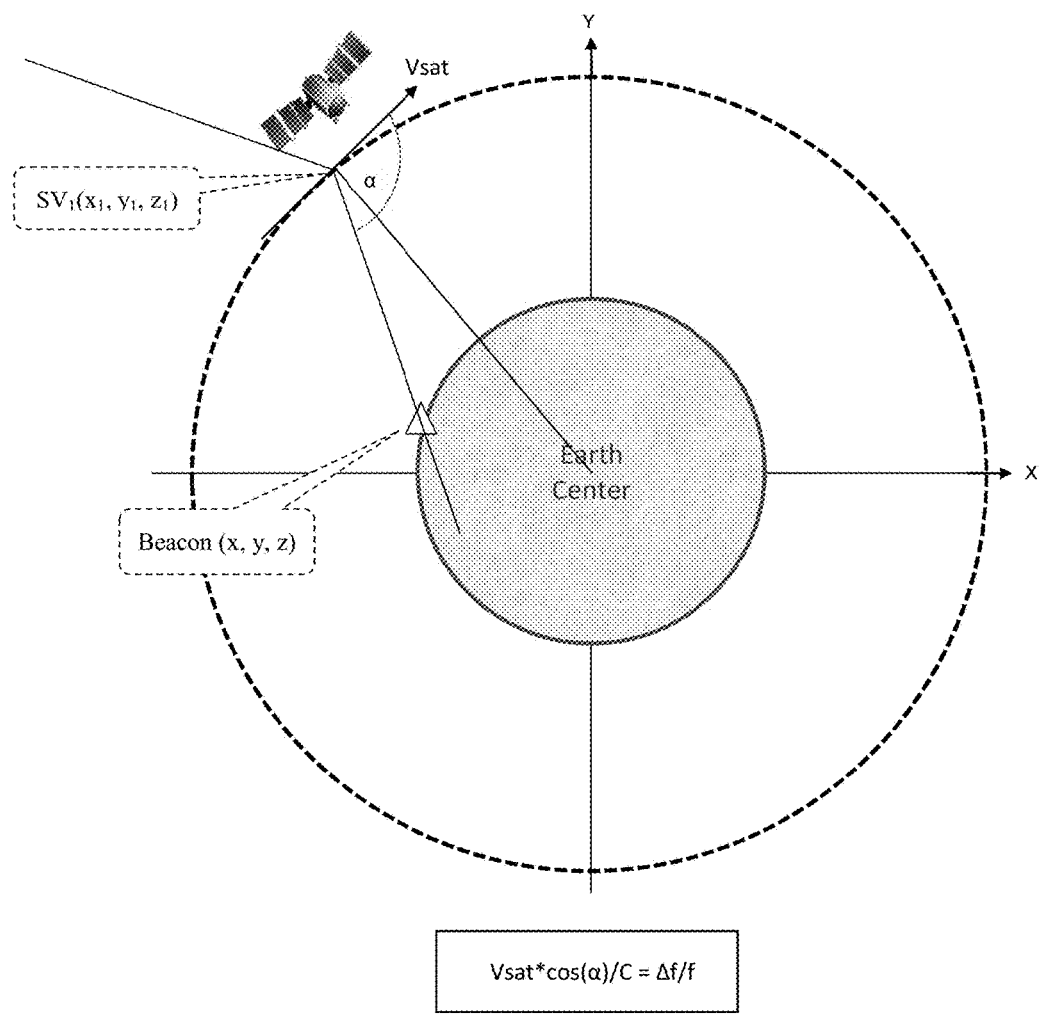
FIG.3 – Beacon Localization based on FOA

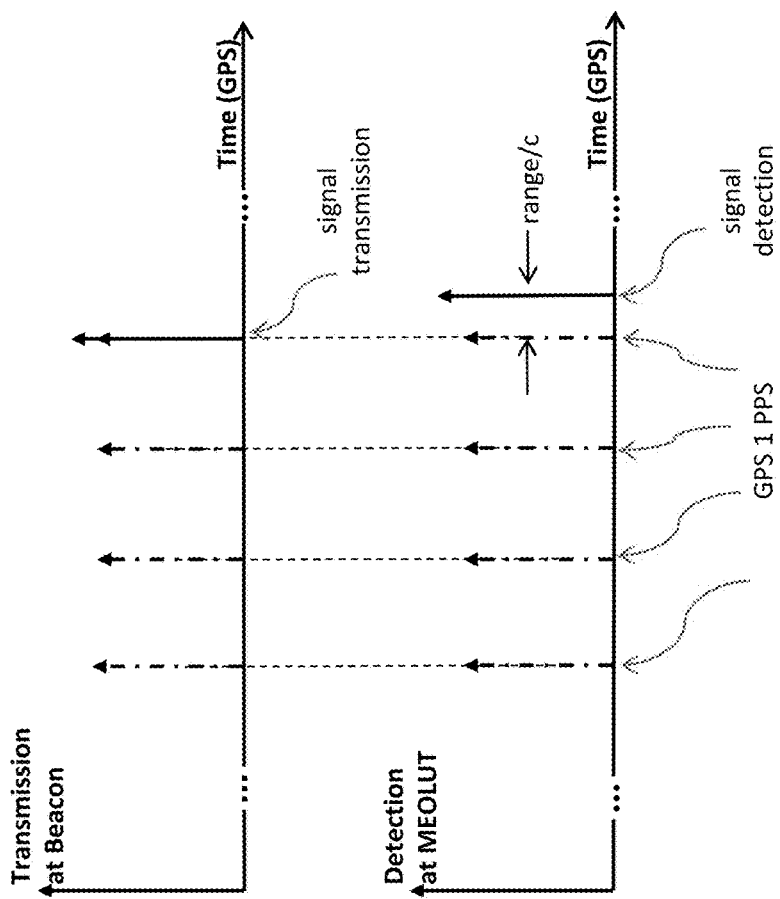

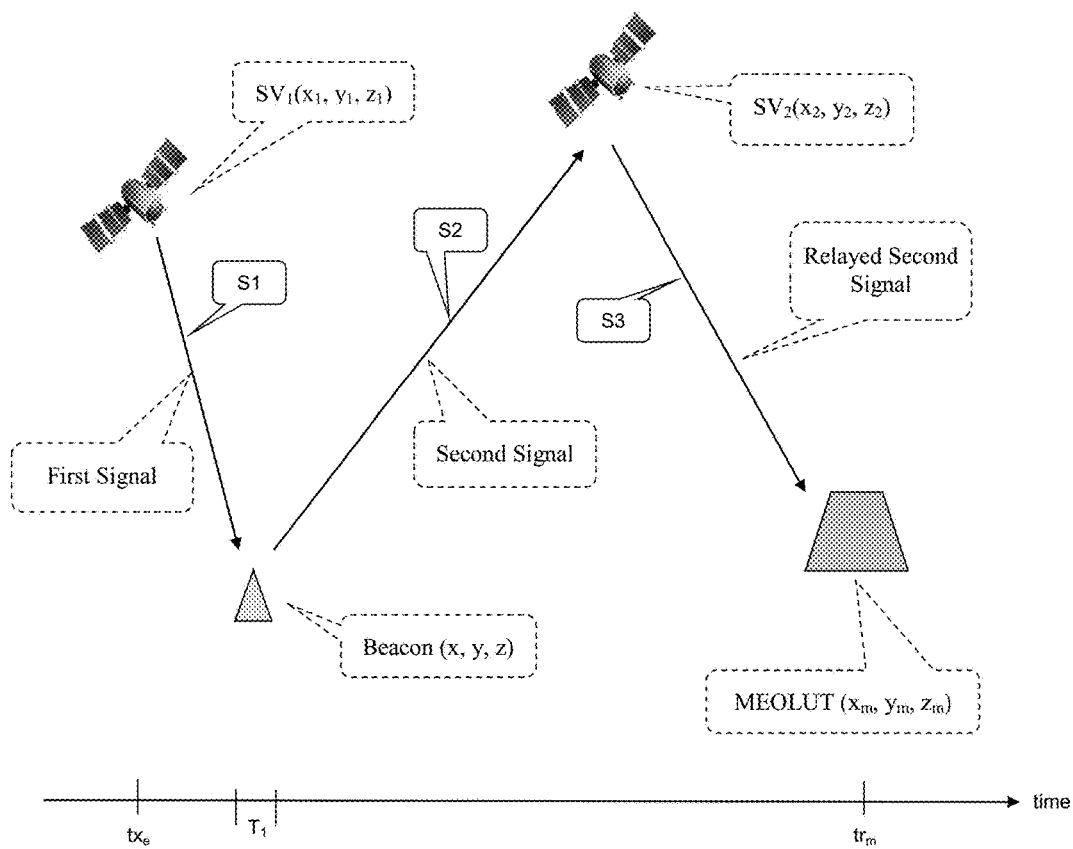
FIG.5 – TOA Configuration According to Present Invention

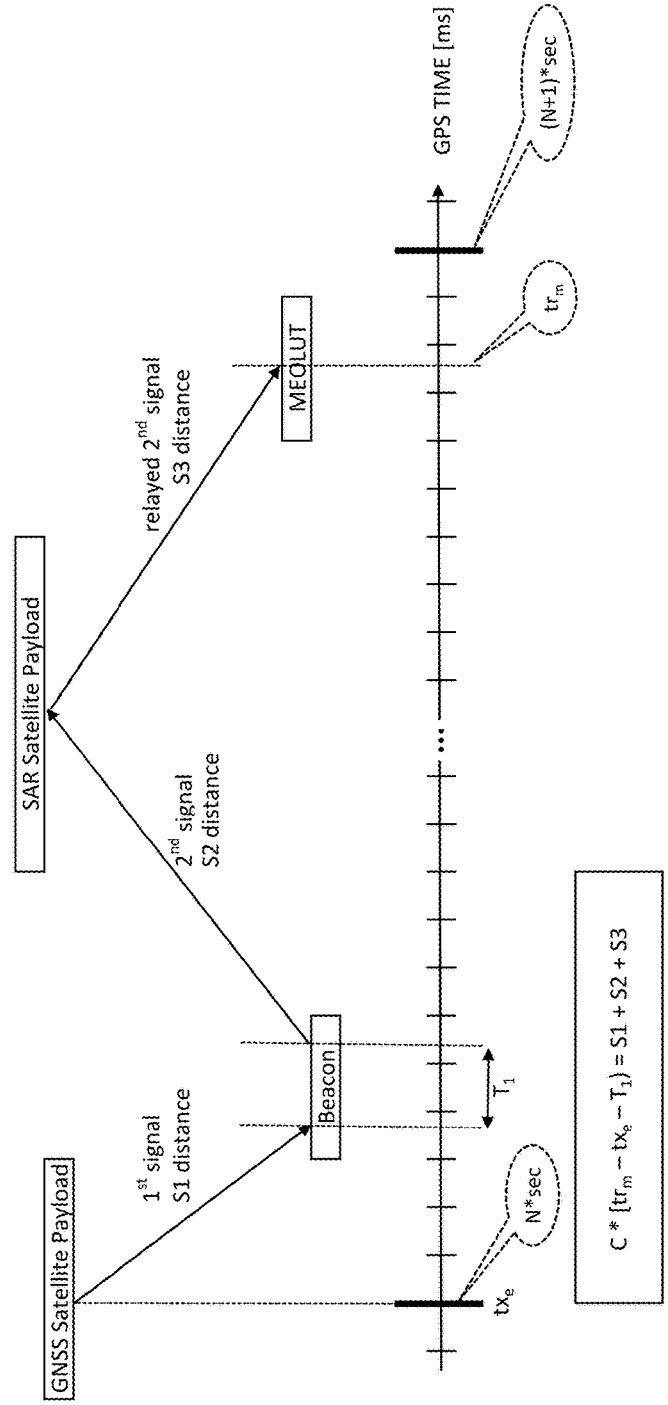

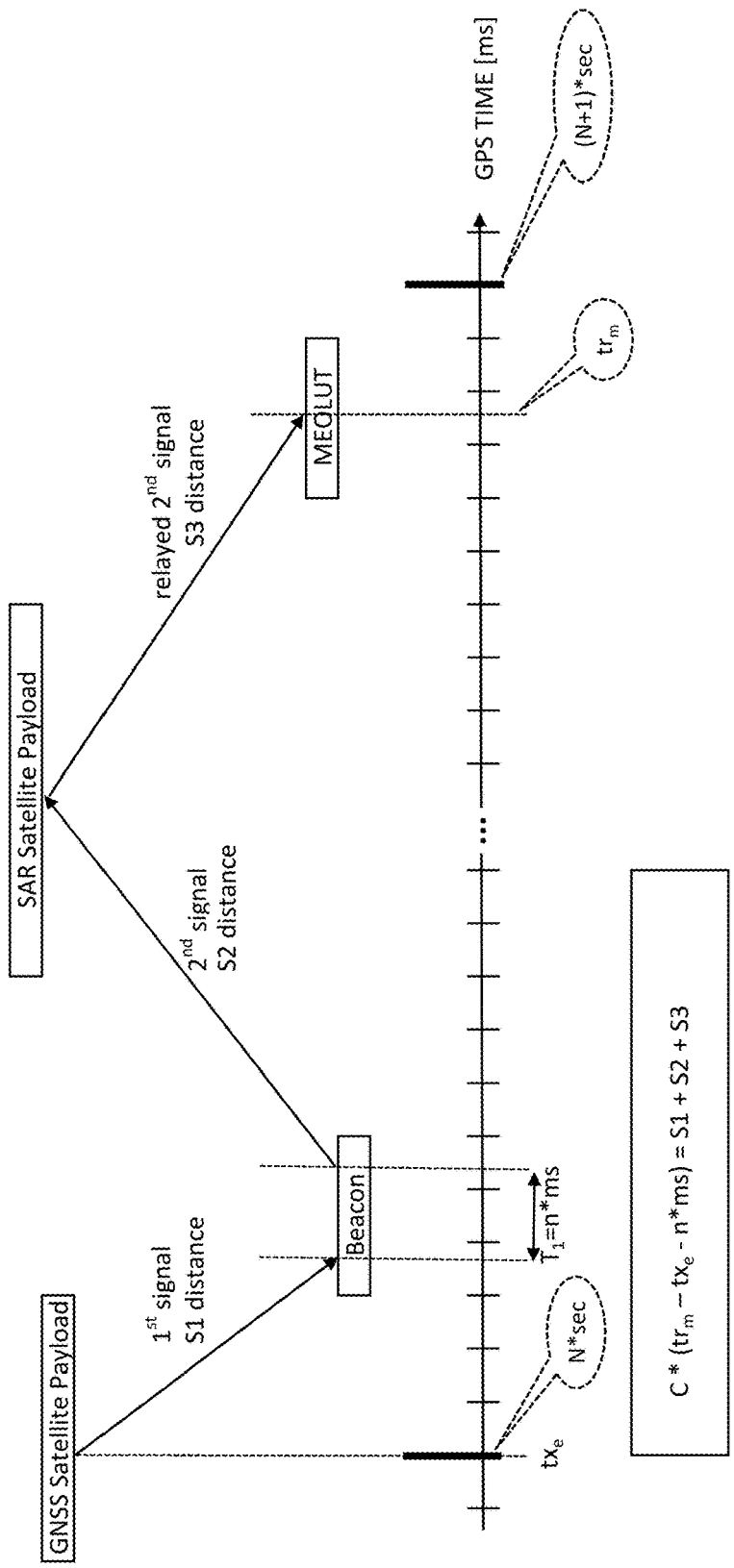

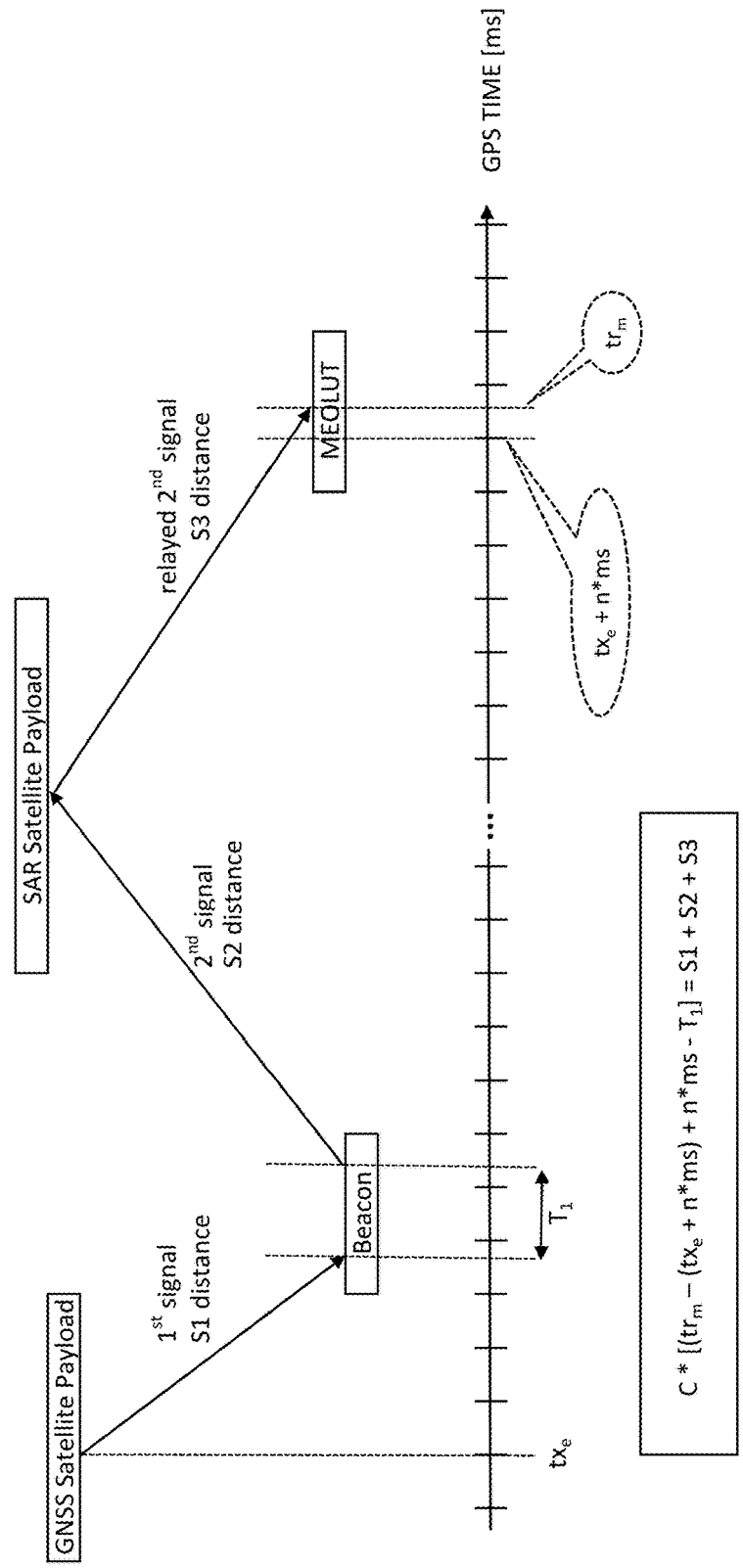
FIG.8 - TOA Measurement According to a 3rd Embodiment of the Present Invention FIG.9 – Beacon Block Diagram
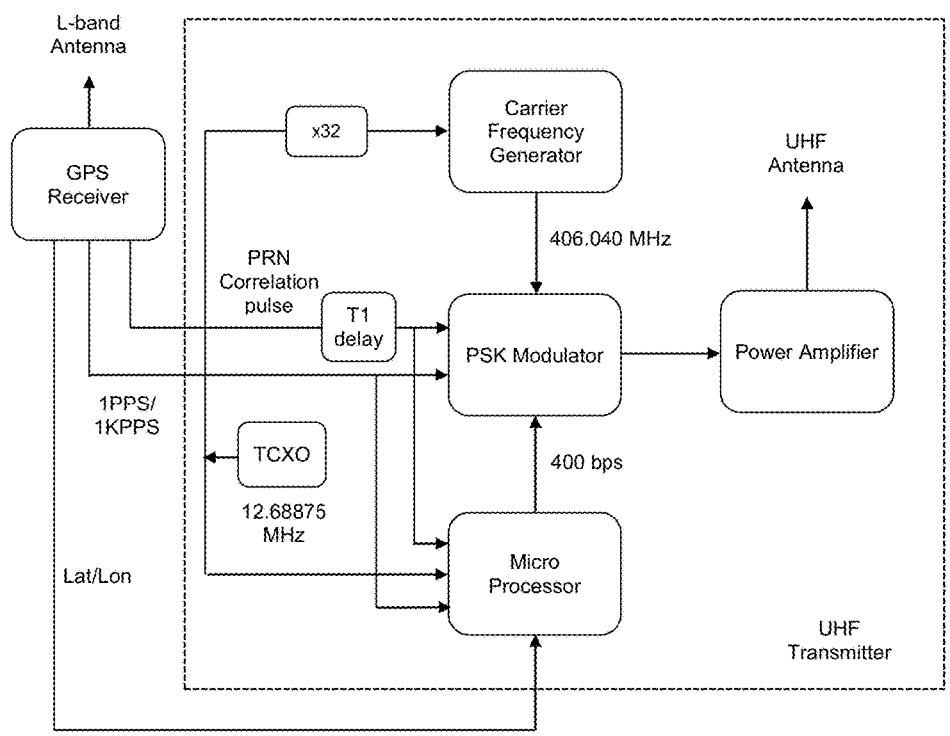

FIG.10 – MEOLUT Block Diagram According to Cospas-Sarsat T.019
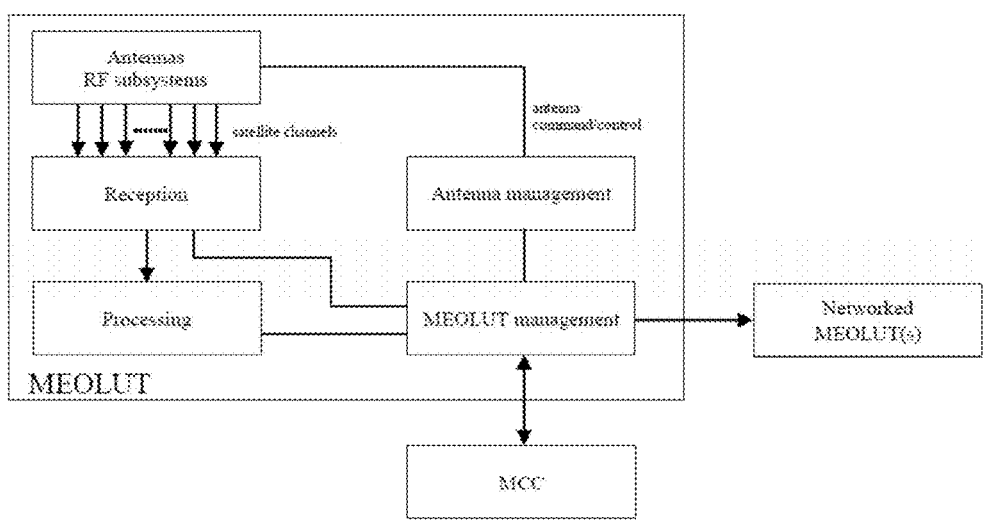

SINGLE BURST SINGLE SATELLITE BEACON LOCALIZATION

BACKGROUND OF THE INVENTION

The present invention relates to the general art of wireless communications and particularly radio navigation and radio localization.

Localization of remote wireless terminals by a satellite system is quite useful in many cases, particularly while being out of the coverage area of terrestrial cellular networks. This requirement is especially relevant in case of emergency, when the position of the terminal can mark the place of a person in distress, either at sea, on the land and even in the air.

Thus, many satellite systems enable localization of compatible terminals, such as satellite mobile phones or data terminals operated by: Iridium, Inmarsat, Globalstar, Thuraya and Orbcomm; and especially dedicated Search and Rescue (SAR) satellite systems, particularly Cospas-Sarsat and its dedicated terminals—radio beacons.

Normally, the localization criteria to evaluate navigation and localization satellite systems are: coverage area, availability and accuracy. State of the art SAR satellite systems, especially Cospas-Sarsat, provide, or will provide in the near future, worldwide coverage, continuous service, 1-2 sec latency and about 100 m accuracy, based on a large constellation of satellites and terrestrial base stations.

While that is an impressive benchmark, it should be recalled that SAR systems are often challenged by extreme environmental or human conditions that badly affect people and devices. For example, localization of a person fallen overboard a ship in a stormy night can be very difficult if located at no better than 100 meters error; a ship tilted and rolled by high seas cannot be expected to have its beacon antenna properly oriented to the satellites; and an airplane crash could badly damage the antenna beacon installed onboard, reducing the number of satellites it can access.

Thus, it is one fundamental object of the present invention to improve the localization accuracy of satellite systems, and enable localization at degraded conditions such as fewer satellites in view.

The present invention is particularly applicable to the international Cospas-Sarsat Search and Rescue satellite system, and though the scope of the invention is much wider, the invention will be sometimes described in terms of the Cospas-Sarsat system, to better explain the invention and some of its embodiments. That definitely does not mean that the present invention is limited to a specific system or application.

A radio beacon is a device that allows tracking a moving object such as ship, aircraft, person, animal or asset via a remote receiver/detector. Depending on the beacon, particularly its transmission frequency and power, the tracking range can be as short as some meters or practically worldwide, in case of satellite served beacons.

Distress radio beacons, also known as emergency beacons: EPIRB (Emergency Position Indicating Radio Beacon) for vessels, ELT (Emergency Locator Transmitter) for airplanes, and PLB (Personal Locator Beacon) carried by individuals, are tracking transmitters which aid in the detection and location of boats, aircraft, and people in distress. In particular, EPIRBs, ELTs and PLBs are served by the worldwide system of Cospas-Sarsat, an international satellite system for search and rescue. When manually activated, or automatically activated (upon immersion or collision), such beacons send out periodic distress signals that are monitored worldwide by the system satellites, and their position is informed to Rescue Coordination Centers (RCC) that coordinate the actual rescue. Presently (2016), almost any country operates an RCC, and Cospas-Sarsat satellites cover the entire world.

The Objective of the Cospas-Sarsat system is to reduce, as far as possible, delays in the provision of distress alerts to SAR services, and the time required for locating a distress and providing assistance, which have a direct impact on the probability of survival of the person in distress at sea or on land.

Presently, the Cospas-Sarsat system is comprised of a SAR segment based on LEO (Low Elevation Orbit) satellites, named LEOSAR, and another segment based on GEO (Geostationary) satellites, named GEOSAR. A SAR segment based on MEO (Medium Elevation Orbit) satellites, named MEOSAR, is in development, planned to be fully operational by 2018; these MEO satellites are part of the GPS, Galileo and Glonass constellations. The Cospas-Sarsat system also comprises base stations that detect the beacon signal relayed by the satellites, determine the beacon position and notify the RCC. The LEOSAR base station is named LEOLUT (LEO Local User Terminal), GEOSAR base station is named GEOLUT and the MEOSAR base station is named MEOLUT.

A Cospas-Sarsat beacon, when activated, periodically broadcast short bursts at 406 MHz, more or less every 50 seconds. These transmissions are modulated with a short message, typically 144 bits long, indicating the beacon unique ID and optionally also self-position acquired by a built-in GNSS receiver. The LEOSAR provides also an independent/autonomous method of localization of the beacon, based on the Doppler Effect, and the MEOSAR provides independent localization based on TOA (Time of Arrival) and FOA (Frequency of Arrival) measurements. One of the major objectives of the MEOSAR is to enable independent localization of the beacon upon a single burst, in order to promptly determine the distress location, especially in airborne applications, before the beacon might get out of order, e.g. upon crashing. However, the MEOLUT, when applying TOA and FOA localization, requires several satellites in common view to relay the beacon burst, typically 3 but not less than 2 in order to the determine the beacon position. Now, though many such satellites are planned to be launched and deployed in few years, the requirement for multi satellites simultaneously in view is still a limit, especially before the full constellations are deployed, but also later at less than optimal conditions, e.g. when a PLB broadcast from a deep canyon or creek, or an EPIRB is extremely tilted at high seas, or an ELT antenna damaged upon emergency landing, or Man overboard with PLB often immersed in the water.

A particular situation that the present invention addresses is the notorious Man overboard (MOB) or Person overboard (POB) accident. Man overboard is a situation in which a person has fallen from a boat or ship into the water and is in need of rescue. People may fall overboard for many reasons: they might have been struck by a part of the ship; they might lose their footing due to a slippery deck or an unexpected movement of the boat, or washed off board by a huge wave. Falling overboard is one of the most dangerous and life-threatening things that can happen at sea. This is especially dangerous with short-handed small boats and particularly single-handed, and in combination with self-steering gear it could be fatal. Thousands of people are lost at sea every year due to MOB. Fast detection and location of such accidents is crucial since survival time in water is short, typically under 6 hours at 10° C.

Technology can be used to assist in the retrieval of people who fall overboard. Many GPS chart plotters designed for marine use have a Man Overboard button (MOB). This button is to be pushed as soon as a Man Overboard alarm is raised, causing the plotter to record the actual position of the ship, i.e. latest known position of the person overboard, as a waypoint to which it is possible to return after a short maneuver.

Several manufacturers make man overboard alarms which can automatically detect a man overboard incident. The hardware consists of individual units worn by each crew member, and a base unit installed onboard. Some systems are water activated: when an individual unit comes in contact with water, it sends a signal to the base unit, which sounds the man overboard alarm. Other automatic detection systems rely on a constant radio signal being transmitted between an individual unit and the base unit; passing outside the transmission range of the individual unit and/or falling into the water causes the radio signal to degrade severely, which makes the base unit sound the man overboard alarm.

Yet, present MOB alert devices, also known as Marine Survivor Locating Devices (MSLD), cannot be located at more than a couple of miles away from the mother ship, so as the victim drifts away, even the onboard record of last known position of MOB becomes obsolete. At high seas and low visibility conditions, locating a MOB becomes a significant challenge.

In addition, MSLDs typically do not employ GPS, since it is not efficient due to the fast and unexpected nature of MOB accidents, and the fact that almost all the victim body is typically in the water, and his/her hands (in case of wrist worn MSLD) are moving, and its antenna is not necessarily in view with the satellites, particularly difficult to detect three satellites for 30 seconds to fix a GPS position.

Indeed, some modern MSLDs employ AIS (Automatic Identification System) or DSC (Digital Selective Calling) transmitters, practically because many vessels are already equipped with AIS or DSC receivers, however the location data provided by AIS and DSC transmitters is based on GPS embedded receivers, and if those cannot fix the MSLD position then the device cannot be localized over AIS or DSC.

It is then another object of the present invention to increase the probability of localization of Marine Survivor Locating Devices (MSLD), especially in severe environmental conditions and particularly in MOB situations.

Other devices in the market, generally called SEND (Satellite Emergency Notification Devices), such as SPOT on the Globalstar satellite constellation, are also used for localization upon distress, yet based on commercial satellite systems. So SEND systems are also relevant to the present invention.

Time of Arrival (TOA) is a well-known localization method in which a receiver calculates its distance to a transmitter based on the time it takes a signal to travel between the transmitter and the receiver, and multiplying the travelling time by the signal propagation speed, usually the speed of light. Theoretically, calculating distances to three transmitters, and knowing these transmitters spatial coordinates, enables a receiver to calculate its own spatial coordinates, by resolving three quadratic equations based on the three dimensional Pythagorean theorem. This method, also known as trilateration, is the basic algorithm employed by Global Navigation Satellite Systems (GNSS) such as the US GPS, Galileo and Glonass. The geometric representation of this method is of three spheres, each sphere having a transmitting satellite at its origin and a radius of the relevant TOA multiplied by the speed of light; these spheres intersecting at two common points, on which of these the receiver is positioned. A similar method is also applied in the Cospas-Sarsat MEOSAR, for localization of a radio beacon. In the MEOSAR, the satellites are installed with receivers, and a radio beacon is localized by measuring the TOA of a signal emitted from the beacon and detected by three of these receivers; actually, the satellites are installed with relays or re-transmitters acting as "bent pipes", i.e. instantaneously relay the beacon signal (converted to a different frequency) to the MEOLUT base station at which the trilateration calculation is performed. FIG. 1 illustrates that method. However, since the beacon transmission time is unknown at the MEOLUT, time measurements of a beacon signal relayed by three satellites provide three TOA equations with 4 unknowns: the beacon (x, y, z) coordinates and the beacon transmission time (tx), provided that the satellites and MEOLUT positions are known, as well as the relayed signal detection time ($tr_1$, $tr_2$ and $tr_3$ respectively). So practically, three time measurements on the beacon signal enable resolving just the beacon 2D (x, y) position, e.g. Latitude and Longitude, assuming that the altitude is known or estimated, as could be applied for example in case of ocean sailing ships. For 3D (x, y, z) position resolution another equation is required, possibly provided by a fourth satellite.

Another way to express the beacon position is by equations that do not include the beacon transmission time, but considering the difference in detection time of the same beacon signal relayed by two satellites. This format is known as TDOA (Time Difference of Arrival), and its 2D geometric expression, i.e. locus on which the beacon should be, is a hyperbola, compared to a circle in 2D TOA, as shown in FIG. 2. Still, a TDOA equation requires two satellites compared to a single satellite for TOA, so detecting the beacon signal relayed by 3 satellites, without knowing the exact transmission time instant, enables only 2D localization of the beacon, either through 3 TOA or 2 TDOA equations, as shown at the bottom of FIG. 1 and FIG. 2. It might appear from FIG. 1 that even 2 TOA circles enable 2D localization (2 points) however if the transmission time is unknown so are the origin and radius of the representing circle. For 3D localization based on time measurements, 4 relaying satellites are required, providing 4 TOA equations with 4 unknowns or 3 TDOA equations with 3 unknowns.

Yet, another type of measurement is employed at present art MEOLUTs contributing to the localization of the beacon: FOA (Frequency of Arrival). If the beacon transmission frequency is known, and the detection frequency is measured (even a relayed converted frequency), and if the satellite position and velocity at the time of relaying the beacon signal are known, then based on the Doppler effect another equation can be compiled for every signal relayed by a satellite and detected at the MEOLUT, as shown in FIG. 3. The geometric expression of that Doppler measurement, i.e. the locus on which the beacon should be, is a cone in 3D and a triangle in 2D (avoiding the base in both cases). Still, if the transmission time of the beacon is unknown, the satellite position and velocity at the time of relaying the beacon signal are also unknown, but can be expressed based on said time.

So, state of the art MEOLUTs can localize a beacon in 3D upon a single burst transmission relayed by as few as 2 satellites in view, by compiling and resolving 4 equations with 4 unknowns (the beacon coordinates and transmission time), expressing 2*TOA and 2*FOA measurements. With only 1 satellite in view, state of the art MEOLUTs cannot localize standard Cospas-Sarsat beacons even in 2D. It is then also an object of the present invention to enable localization of a beacon at the MEOLUT with only 1 satellite in view, particularly upon a single beacon burst transmission.

U.S. Pat. No. 7,522,639 by D. Katz, discloses a method for SYNCHRONIZATION AMONG DISTRIBUTED WIRELESS DEVICES BEYOND COMMUNICATIONS RANGE. Katz discloses communication devices configured to communicate with each other, which are usually dormant in order to save battery power, yet can simultaneously wake up and perform communication, upon sensing a same external event. That method, though very instrumental in certain scenarios, is difficult to apply worldwide such as required from distress beacons. In particular, there are not many practical options for generating an external event that could be sensed by and trigger beacons deployed in the middle of the ocean. Satellites do provide such an option but require a receiver at the beacon, which is not in the scope of U.S. Pat. No. 7,522,639.

A method enabling localization of a beacon at the MEOLUT with only 1 satellite in view is disclosed in U.S. patent application Ser. No. 14/465,872 filled by the present inventor, D. Katz, titled: Tracking a Radio Beacon from a Moving Device. Katz discloses there: " . . . preferably, the transmission time instants and receiving time instants may be determined with respect to a same time reference, such as the GPS time. In this case, the time transmission may be encoded in reference to the last rising edge of the GPS 1 PPS (pulse per second) signal". For example, as shown in FIG. 4 of the present invention the beacon is configured to transmit a burst exactly at the 1PPS epoch, acquired by a GNSS receiver comprised in the beacon. The MEOLUT that also has access to this 1PPS signal, measures the difference in time between the detection time of the (possibly relayed) beacon signal and the previous closest 1PPS signal, and multiplying this time measurement by the speed of light (C) provides the distance (i.e. pseudorange) travelled by the signal from the beacon to the MEOLUT. The satellite relay is considered to be "bent pipe", however adding a certain delay, typically less than 1 micro second, which can be estimated and subtracted from said overall time measurement.

However, the 1PPS signal indicating the accurate GPS TIME is acquired at a GNSS receiver only upon solving the navigation equations, i.e. fixing self-position, and for that at least 3 satellites in view are required. Now, if the navigation satellites (GNSS) used by the beacon to acquire self-position and accurate time are different from the satellites used to relay the transmitted signal to the base station, as is the case in the older Cospas-Sarsat segments—LEOSAR and GEOSAR, then it is possible that a beacon will have 3-4 navigation satellites in view, acquire the 1PPS and use a single SAR satellite to relay a distress signal to a base station (LEOLUT or GEOLUT); however, in the MEOSAR the same satellites—GPS, Galileo and Glonass carry both GNSS and SAR payloads, so any satellite in view provides both GNSS and SAR services, just that for SAR the satellite should be in common view by beacon and MEOLUT. Nevertheless, the total number of satellites involved in the beacon localization in present art systems is not less than 2 upon a single beacon burst; sometimes a single satellite can be employed but at several positions, i.e. using several bursts, e.g. as disclosed by U.S. patent application Ser. No. 14/465,872.

Synchronizing the transmission to a globally acquired clock, such as GPS TIME, which can be also acquired independently at the receiver, basically enables the receiver to determine the transmission time of a beacon and use TOA equations; so if, for example, the beacon transmits a burst at the rising edge of the 1 second GPS TIME clock, as illustrated in FIG. 4, the receiver measures the delay between the relayed beacon signal detection time and the rising edge of the last 1PPS pulse acquired from the GNSS and that is considered the TOA. However, this method obtains some ambiguity, since the receiver does not know at which specific 1PPS pulse the beacon transmitted. The fact that the receiver refers to the last 1PPS pulse is based on the assumption that a more distant pulse means additional 1 sec of travelling, equivalent to additional 300,000 Kms of travelling, which is not expected with satellites orbiting some 20,000 Kms above the earth. Yet, in certain cases it is desirable to synchronize the transmission to a faster clock, e.g. 1 KPPS, and that could introduce an ambiguity which is more difficult to remove.

So it is yet another object of the present invention to synchronize TOA measurements to a globally acquired clock pulse, even with short period such that result in ambiguous TOA expressions.

GNSS signals, as known to the skilled person, report the transmission time instant, which is very instrumental in resolving the navigation equations. Cospas-Sarsat beacons, however, do not report that time, probably due to bandwidth limitations and lack of accurate built in clock. Furthermore, Cospas-Sarsat specifications call for a pseudo random pattern of transmission time intervals in order to decrease the probability of transmission collisions among a plurality of beacons. Theoretically, a beacon could transmit at pseudo random time intervals and still synchronize its transmissions to a global clock such as the 1 KPPS, however that is impossible when this clock is not acquired at the beacon, due to lack of navigational satellites in view, for example. Thus, it is still an object of the present invention to enable TOA measurements even if the exact transmission time of the beacon is unknown at the MEOLUT; it is still another object of the present invention to enable localization of a beacon even if no globally referenced time signal is available at the beacon, such as GPS TIME (1 PPS) or UTC (Universal Time Coordinated) or GMT (Greenwich Mean Time).

When enough satellites are in common view by the beacon and MEOLUT, enough time based and frequency based equations can be compiled at the MEOLUT to resolve the beacon coordinates; still, as known in the art, more measurements enable more equations based on the same unknowns, and having more equations than unknowns enable reducing the standard deviation error, i.e. more accurate localization. In this context, it is also an object of the present invention to enable more accurate localization of a beacon based on a certain number of satellites in view.

Other objects and advantages of the invention will become apparent as the description proceeds.

SUMMARY OF THE INVENTION

The present invention discloses a method for localization of a radio beacon at a remote receiver, via a first satellite payload and a second satellite payload, comprising the steps of:
a. a. Configuring said first satellite payload to broadcast a first signal at a known epoch;
b. Configuring said radio beacon to:
Determine the detection time of said first signal;
Transmit a second signal a predefined delay after said detection time;

c. Configuring said second satellite payload to relay said second signal;
d. Configuring said remote receiver to:
Record the detection time of said relayed second signal, and said known epoch;
Determine self-position, the position of said first satellite payload and the position of said second satellite payload;
Enable expressing the location coordinates of said beacon based on said time records, said predefined delay, and said determined positions.

The disclosed method further comprising the steps of:
a. Configuring said first payload to periodically repeat said epoch and correspondingly said first signal transmissions at fixed time intervals;
b. Configuring said radio beacon to dynamically select at least one of said first signals detection time after which said second signal is transmitted;
c. Configuring said remote receiver to enable expressing the location coordinates of said beacon up to a certain ambiguity, even if said dynamic selection is unknown at the remote receiver, and further removing said ambiguity or at least decreasing it by additional information acquired or considered at the remote receiver.

Said known epoch, upon which said first signal is transmitted, can be a specific time instant or cyclic; for example a certain clock at which said first signal is transmitted, a specific or any of this clock rising edges defined as the epoch, even if the specific edge or specific tick of this clock is not determined. In particular, said first signal can be transmitted repeatedly at a fixed period, said radio beacon configured to dynamically select one of said first signals detection time after which said second signal is transmitted, and still enabling said remote receiver expressing the location coordinates of said beacon up to a certain ambiguity, even without knowing said dynamic selection, where this ambiguity can be removed or at least decreased by further information acquired at said remote receiver.

Generally, said payloads could be installed at stationary sites, or at mobile stations not necessarily satellites, yet obviously satellites orbiting around the earth cover large areas, and though their position change rapidly, challenging the beacon localization based on that position determination, present art addresses that well, particularly in GNSS—Global Navigation Satellite Systems. As well known in the art, GNSS satellites broadcast data, particularly ephemeris, enabling a GNSS receiver to accurately determine the satellite orbit and on-orbit momentarily position. Not less important for localization are accurate time measurements, and this is also enabled and well administered by present art GNSS; furthermore, the accurate GNSS master time can be easily acquired anywhere the navigation signals are detected, i.e. practically worldwide, so both transmitters (satellites, beacons) and receivers (base stations, localization receivers) can refer to a common accurate universal time and clock, such as UTC (Universal Time Coordinated) or GPS TIME for TOA measurements.

Therefore, the present invention, though not limited to satellites and neither to GNSS, can greatly benefit from these, and preferred embodiments are engaged with GNSS. Thus, and in order to explain the invention clearly, GNSS language and terminology will be used. Furthermore, according to a preferred embodiment of the invention said beacon is for search and rescue of people in distress, particularly in the framework of the Cospas-Sarsat system. So also the Cospas-Sarsat language and terminology will be used in the description of the invention, and the skilled person should recall that the scope of the invention is wider than these specific embodiments, as far as the claims cover.

So preferably, said first satellite payload is a GNSS payload broadcasting navigation signals, such as GPS or Galileo or Glonass, said beacon is a Cospas-Sarsat PLB (personal beacon) or EPIRB (ship-borne beacon) or ELT (airborne beacon) and said second satellite payload serves to relay beacon signals back to base stations, usually known in the art as SAR payload, such as SAR/Galileo, DASS/GPS and SAR/Glonass. Accordingly, said remote receiver is preferably a MEOLUT, i.e. base station in the Cospas-Sarsat MEOSAR system segment, wherein each satellite is mounted with both GNSS and SAR payloads, so in terms of the present invention each of these satellites carries onboard both a first and a second payload.

Regarding said first signal, GPS satellites typically broadcast two periodic signals simultaneously modulating the carrier: the navigation message and the PRN (Pseudo Random Noise) spread spectrum sequence, both signals controlled by the satellite atomic clock(s), which is synchronized with the GPS TIME clock up to typically some nanoseconds deviation which is reported by each satellite and can be accounted for. The navigation message is divided to frames and subframes, all aligned with the satellite master clock, wherein each subframe is 300 bits long, i.e. 6 seconds long. At each subframe the first two groups of 30 bits are the TLM and HOW words, well recognizable by a GPS receiver; actually, present art GPS receivers may well recognize the rising edge of the navigation message bits, i.e. recover the satellite 50 Hz (=1/20 ms) clock. Accurately detecting the PRN chip clock, typically with a digital correlator, enables a GPS receiver also to recover the satellite 1 KPPS (=1/ms) clock, referring to the C/A (Coarse/Acquisition) service, which as a skilled person appreciates is synchronized with the navigation message clock. Both the PRN and navigation message simultaneously start at a known epoch, aligned with the satellite master clock, i.e. synchronized with the GPS TIME up to a slight correctable deviation. The C/A PRN sequence, in particular, with a 1 ms period, starts exactly at the 1 KPPS rising edge. This synchronization of GPS satellite clocks and signals is a fundamental feature in GNSS, enabling receivers to resolve the navigation equations, based on the fact that all satellites report their position related to the same time, to which the navigation equations are resolved; in the geometrical expression, at this very time the origin of intersecting spheres is defined, and the resolved intersection is associated with. At the GPS receiver, the detection time of the signal broadcast by a satellite is determined by correlating the received signal to an internally generated replica of the satellite PRN sequence, and accounting for the transmission time reported by the satellite, the TOA is determined, and accordingly the pseudorange. According to one embodiment of the present invention, the transmission time instant of the GNSS PRN is used as the known epoch, i.e. the time instant at which said first signal is transmitted. As already mentioned, the advantage of selecting this epoch is that both the transmitter (first satellite payload) and the remote receiver can refer to it, even though they are far remote from each other and not physically connected to the same clock; furthermore, even if the specific tick of the 1 ms clock at which said first signal was transmitted is unknown at the remote receiver, and the remote receiver refers to a different phase of this universally acquirable clock, this could cause an ambiguity of n*1 ms in TOA measurement, i.e. n*1 ms*C=n*300 Km in pseudorange, which could be later removed. For example, redundant measurements (involving additional satellites or additional transmissions) could be used to remove said ambiguity, or practical considerations (ship position is not likely to be on ground), or communication limitations (resolved position cannot be out of satellite footprint), etc.

However, even if a GNSS receiver at the beacon may accurately determine the local time at which said PRN was detected, it cannot determine said epoch, i.e. the time at which said PRN was transmitted, until the exact distance between satellite and receiver is determined, i.e. until the navigation equations are resolved and the position is fixed. But as known to persons skilled in the art, at least 3 GNSS satellites in view are required to fix the position at a GNSS receiver, so also the transmission epoch requires 3 satellites in view to be precisely determined at the GNSS receiver. Nevertheless, the present invention discloses that even if a beacon with embedded GNSS receiver cannot determine the GNSS transmission epoch, and cannot align its transmission to that globally detectable time reference, the remote receiver could still determine the beacon transmission time, perhaps up to a certain ambiguity, and use that to resolve TOA equations in order to localize the beacon.

The radio beacon, preferably installed with a GNSS receiver, is configured to detect the GNSS signal, and record the detection time, i.e. the time at which correlation was achieved with the incoming PRN sequence. This detection time, as explained before, is equal to the GNSS transmission time instant plus the time it took the signal to travel from the satellite to the beacon, which is unknown at the beacon if less than 3 satellites are in view. Then, the beacon is configured to transmit at least one distress signal synchronized to that detection time, i.e. exactly a predefined delay ($T_1$) after said detection time. This predefined delay could be fixed, or may vary from time to time or from beacon to beacon, and it could be known to the remote receiver, either in advance or communicated in any direct or indirect way, e.g. encoded in the distress message. Moreover, it is not mandatory that the MEOLUT will know $T_1$ specifically, yet possibly the MEOLUT knows the characteristics or pattern of the way that $T_1$ is set at the beacon, enabling the MEOLUT to assess $T_1$ up to a certain ambiguity. For example, defining $T_1=n*T$, wherein n is a natural number and T is a time period agreed upon by the beacon and the remote receiver, wherein n is dynamically selected at the beacon but not communicated to the remote receiver, can add an ambiguity of up to n*300 Km to the beacon position resolution which could be addressed as described above in relation to the first signal transmission epoch ambiguity.

The specific PRN, i.e. ID number of the satellite associated with said first signal, should preferably be communicated to the remote receiver, so the position of the proper satellite would be used in the process of beacon localization. This parameter could be communicated in said second signal, or possibly encoded in $T_1$, either explicitly or implicitly. It is also possible that the MEOLUT will self-determine that satellite ID, e.g. when only 1-2 satellites are in common view from the beacon and the MEOLUT, particularly if both the first and second payloads refer to the same satellite. Also, a rule of selecting the synchronizing satellite from those visible by the beacon could be agreed upon in advance, avoiding the need to communicate that information explicitly, e.g. highest satellite in view or smallest ID of satellites above 15 degrees of elevation, etc. When 3 or more satellites are in view then the beacon can already acquire the GPS TIME 1PPS clock and accordingly synchronize its transmissions to, and the MEOLUT could be aware of that when realizing that the encoded GNSS position reported by the beacon is valid.

The beacon transmission, i.e. second signal, is preferably a short RF burst modulated by 144 bits, reaching the satellite second payload, mapped into the L-band and immediately relayed to the ground. Typically the satellite relay delay is less than 1 microsecond (300 m ambiguity), however in order to refine the TOA calculation at the MEOULT the average delay could be accounted for.

At the MEOLUT the relayed second signal is detected and its detection time is carefully recorded. In addition, the MEOLUT determines its position and the position of the first and second satellite(s), (could be different satellites or the same satellite carrying both GNSS and SAR payloads), the first at the time of transmission of the first signal, and the second at the time of relaying the second signal. These can be determined by monitoring and processing the GNSS signals that accurately specify the satellite orbital elements and on-orbit motion, mainly the ephemeris data reported in the navigation message. Knowing the orbital elements of the satellite and the time at which said satellite visited a specific point on its orbit, known as perigee, enables determining the spatial position of the satellite at any time; in other words, according to Kepler laws of planetary motion, for given orbital elements there is a unique relation between time and position of a satellite, which could be used by GNSS receivers in order to populate the navigation equations with satellites coordinates, and also by the MEOLUT according to the present invention.

The GPS TIME 1PPS is also accurately acquired at the MEOLUT, as well as the 1 KPPS clock. Typically, the MEOLUT is installed where the entire upper hemisphere is visible, so it is assumed to always have more than 3 satellites in view (not necessarily those or any in view by the beacon), thus always administer an accurate GPS TIME.

Based on said determined positions of: GNSS satellite, SAR satellite and MEOLUT; in addition to said time records of: GNSS epoch, predefined delay at the beacon, and the relayed signal detection time at the MEOLUT, the MEOLUT can compile an equation with only the beacon coordinates unknown, which could be instrumental in the localization of the beacon. On one side of this equation the travelling time of the combined [GNSS signal+$T_1$ delay+beacon burst uplink+relayed beacon burst downlink] multiplied by the speed of RF travelling; on the other side of this equation the total travelled distance: [GNSS satellite to beacon]+[beacon to SAR satellite]+[SAR satellite to MEOLUT]. The equation, also illustrated in FIG. 5, is:

$$C*(tr_m-tx_e-T_1)=\sqrt{[(x-x_1)^2+(y-y_1)^2+(z-z_1)^2]}+\sqrt{[(x-x_2)^2+(y-y_2)^2+(z-z_2)^2]}+\sqrt{[(x_m-x_2)^2+(y_m-y_2)^2+(z_m-z_2)^2]}; \quad [\text{eq.1}]$$

Wherein:
C=the speed of light
$tr_m$=detection time of the relayed second signal at the MEOLUT
$tx_e$=transmission time of first signal (GNSS/PRN epoch)
$T_1$=predefined delay at the beacon from detection of first signal to transmission of second signal
(x, y, z)=coordinates of the beacon (unknown)
($x_1$, $y_1$, $z_1$)=coordinates of the first satellite payload at the time of transmission of first signal
($x_2$, $y_2$, $z_2$)=coordinates of the second satellite payload at the time of relay of second signal
($x_m$, $y_m$, $z_m$)=coordinates of the MEOLUT (remote receiver) at the time of detection of relayed signal.

The epoch $tx_e$ can be determined at the MEOLUT based on the acquired GPS TIME, particularly the 1PPS and 1 KPPS clocks, and the GNSS satellite clock deviation from GPS TIME, as reported by the satellite in the navigation message. Observing the left side of [eq.1] it is clear that an ambiguity of 1 ms in determining $tx_e$ or $T_1$ at the MEOLUT can yield an error of 300 Km (in the total signal path). As already indicated, there are several ways to address this ambiguity, even beyond the scope of the present invention. Yet if such ambiguity is too challenging for a specific embodiment or application of the present invention, a higher granularity can be chosen for these parameters. For example, considering a 1 sec epoch yields ambiguity of 300,000 Km and this can definitely be removed since it is more than 10 times larger than the satellite footprint diameter and the distance between a MEO satellite and the earth.

In 2D localization the beacon altitude $\sqrt{[x^2+y^2+z^2]}$ is determined somehow, e.g. ship borne beacon assumed at mean sea level: $\sqrt{[x^2+y^2+z^2]}=R_{earth}$; so:

$$z^2=R_{earth}^2-(x^2+y^2); \qquad [eq.2]$$

Wherein: $R_{earth}$=mean radius of the earth, about 6371 Km;

Combining then [eq.1] with [eq.2] leaves us with only 2 unknowns (x, y), and in order to resolve the beacon 2D position, another equation with these 2 unknowns is required.

For 2D localization based on a single burst and single satellite in view it is possible to compile such another equation based on FOA measurements.

The FOA measurement is well known in the art, based on the Doppler Effect, and its basic equation, as illustrated in FIG. 3, is:

$$Vsat*\cos(\alpha)/C=\Delta f/f; \qquad [eq.3]$$

Wherein:
Vsat=the second satellite payload velocity at the time of relaying the second signal
$\alpha$=the angle between the satellite movement direction and the beacon
C=the speed of light
f=the beacon transmission frequency
$\Delta f$=the Doppler shift at the remote receiver (in terms of the original transmission frequency)

In 2D the angle $\alpha$ defines a line of position (actually two lines symmetric over the Vsat direction but one of this lines points away from the earth) and in 3D it defines a conic surface of position.

The beacon transmission frequency can be determined at the MEOLUT in several ways. For example, by accessing a data base in which the beacon details are recorded (typically administered by Cospas-Sarsat or national authorities); alternatively, by assessment in real time since Cospas-Sarsat beacons broadcast at a predefined frequency dictated by the authorities and changed every couple of years (e.g. in 2015 all manufactured beacons were set to 406.040 MHz).

Vsat can be determined by the MEOLUT based on the satellite orbital elements broadcast by each satellite and detected at the MEOLUT, applying Kepler or Newton laws.

$\Delta f$=Doppler shift=difference between received and transmitted frequency, can also be measured at the MEOLUT. The received frequency is typically named FOA=Frequency of Arrival. It should be noted that the MEOLUT should account for the Doppler shift in the uplink, due to satellite-beacon speed, and downlink due to satellite-MEOLUT speed, and also to possible frequency conversion at the relay: Galileo satellites convert the 406 MHz uplink to an L-band downlink, and GPS satellites employ L-band or S-band downlink.

Satellite Doppler navigation is well known in the art (e.g. implemented in the ARGOS satellite system, and in the legacy US Navy TRANSIT satellite system, a predecessor of GPS) and does not need further explanation here for a person skilled in the art.

It is further possible, according to the present invention, to determine the beacon position based on multiple bursts emitted by the beacon, assuming that the beacon is stationary or at least does not move much between bursts. This is a reasonable assumption for PLBs (carried by individuals) and even EPIRBs (installed onboard vessels) since present generation beacons typically transmit every 50 s (according to Cospas-Sarsat spec T.001), and in distress such beacons are not expected to move quickly. For example, a beacon drifted at 6 Km/h=10 min/Km, will change its position by 83 m in 50 s. For second generation beacons (SGB), Cospas-Sarsat spec T.018 defines an initial transmission schedule of 5 s between bursts, so even an airplane carrying an ELT, moving at 300 Km/h will change its position by only 415 m in 5 s; this might not enable a very accurate localization but still could help.

The, even without FOA measurements, it is possible configuring the beacon to transmit said second signal twice, either each of said second signals delayed at $T_1$ after detecting a first signal, i.e. two pairs or more of [first+second] signals, or one pair of [first+second] signals and then further second signals, a predefined interval ($T_2$) in between two consecutive second signal transmissions, and configuring said remote receiver to resolve the beacon coordinates at least in 2D. This is enabled, as a skilled person already appreciates, by resolving a set of two [eq.1] with two unknowns—the beacon (x, y) coordinates, assuming a fixed altitude according to [eq.2]. This approach could be useful for mobile remote receivers, preferably small, low cost and low in power consumption to which accurate time measurement seems more practical than accurate frequency measurement.

If FOA measurements are applied at the remote receiver, as typically done at MEOLUTs, then it is possible configuring said beacon to transmit said second signal twice, and configuring said remote receiver to resolve the beacon 3D coordinates. This approach is enabled, as a skilled person may well appreciate, by resolving a set of two [eq.1]+two [eq.3] with three unknowns—the beacon (x, y, z) coordinates. Actually, this approach obtains some redundancy, involving four equations with only three unknowns, and this redundancy can be exploited in several ways. Theoretically, if the TOA and FOA measurements are accurate, then we can just neglect one of these four equations. But practically these measurements involve noise, and assuming Gaussian white noise, the least squares method can be applied in order to calculate an optimal solution for the four equations, i.e. minimum standard deviation error. A Kalman filter is also an option to reduce the statistical error, especially as more bursts are transmitted by the beacon and processed at the MEOLUT.

Said predefined interval ($T_2$) at which the sequential burst transmissions differ in time is a way to keep the time synchronization acquired at the previous burst and avoid the need to detect the first signal again. Obviously it is possible to apply the basic method twice, i.e. transmit two consecutive bursts each $T_1$ after detecting a first signal at the beacon, yet in case that it is difficult to acquire navigation signals, or for any other reason, the first time synchronization can be still valid for repetitive second signal bursts, provided that the MEOLUT is aware of that $T_2$. In this case, defining $tx_{b1}$=transmission time of first burst and $tx_{b2}$=transmission time of second burst, wherein $tx_{b2}=tx_{b1}+T_2$, then a set of 4 equations can be compiled to resolve the beacon 2D position (x, y), and by the way resolve also $tx_{b2}$ and $tx_{b1}$. Accordingly, in the following four [eq.4] equations, the first two are related to the first burst TOA, a third equation relates to the second burst TOA, and the fourth equation expressing the relation between the transmission time of first and second bursts. The four [eq.4]:

$$C*(tx_{b1}-T_1-tx_e)=\sqrt{[(x-x_1)^2+(y-y_1)^2+(z-z_1)^2]}$$

$$C*(tr_{m1}-tx_{b1})=\sqrt{[(x-x_2)^2+(y-y_2)^2+(z-z_2)^2]}+\sqrt{[(x_{m1}-x_2)^2+(y_{m1}-y_2)^2+(z_{m1}-z_2)^2]}$$

$$C*(tr_{m2}-tx_{b2})=\sqrt{[(x-x_3)^2+(y-y_3)^2+(z-z_3)^2]}+\sqrt{[(x_{m2}-x_3)^2+(y_{m2}-y_3)^2+(z_{m2}-z_3)^2]}$$

$$tx_{b2}=tx_{b1}+T_2$$

Wherein:
C=the speed of light
$tx_{b1}$=beacon transmission time of second signal (first burst)
$tx_{b2}$=beacon transmission time of second signal (second burst)
$tr_{m1}$=detection time of the relayed second signal (first burst) at the MEOLUT
$tr_{m2}$=detection time of the relayed second signal (second burst) at the MEOLUT
$tx_e$=transmission time of first signal (GNSS/PRN epoch)
$T_1$=predefined delay at the beacon from detection of first signal to transmission of second signal
$T_2$=predefined interval between beacon transmissions of second signals (first and second bursts)
(x, y, z)=coordinates of the beacon (unknown), assumed stationary between bursts
$(x_1, y_1, z_1)$=coordinates of the first satellite payload at the time of transmission of first signal
$(x_2, y_2, z_2)$=coordinates of the second satellite payload at the time of relaying first burst
$(x_3, y_3, z_3)$=coordinates of the second satellite payload at the time of relaying second burst
$(x_{m1}, y_{m1}, z_{m1})$=coordinates of the MEOLUT at the time of detection of relayed first burst
$(x_{m2}, y_{m2}, z_{m2})$=coordinates of the MEOLUT at the time of detection of relayed second burst Obviously if the MEOLUT is stationary then $x_{m1}=x_{m2}$, $y_{m1}=y_{m2}$ and $z_{m1}=z_{m2}$.

Also, as mentioned before, the above defined positions of satellite payloads (1, 2, 3) may refer to different satellites or same satellite at different positions.

As a skilled person may appreciate, the four equations forming [eq.4] can be further elaborated to only two equations with two unknowns (x, y), marked as [eq.5]:

$$C*(tr_{m1}-T_1-tx_e)=\sqrt{[(x-x_1)^2+(y-y_1)^2+(z-z_1)^2]}+\sqrt{[(x_{m1}-x_2)^2+(y_{m1}-y_2)^2+(z_{m1}-z_2)^2]}$$

$$C*(tr_{m2}-T_1tx_e-T_2)=\sqrt{[(x-x_1)^2+(y-y_1)^2+(z-z_1)^2]}+\sqrt{[(x-x_3)^2+(y-y_3)^2+(z-z_3)^2]}+\sqrt{[(x_{m2}-x_3)^2+(y_{m2}-y_3)^2+(z_{m2}-z_3)^2]}$$

In terms of FIG. 5 these are equivalent to:

$$C*(tr_{m1}-T_1-tx_e)=S1(1^{st}\text{ burst})+S2(1^{st}\text{ burst})+S3(1^{st}\text{ burst})$$

$$C*(tr_{m2}-T_1-tx_e-T_2)=S1(1^{st}\text{ burst})+S2(2^{nd}\text{ burst})+S3(2^{nd}\text{ burst})$$

Further, [eq.5] in addition to [eq.2] enable a 2D resolution (x, y) of the beacon position.

Further, [eq.5] in addition to [eq.3] enable a 3D (x, y, z) resolution of the beacon position.

$T_2$ as $tx_e$ and $T_1$, are preferably known at the remote receiver, however not necessarily in absolute value, rather may present some ambiguity. For example, if $T_2=n*1$ ms, wherein n changes from time to time at the beacon but not explicitly communicated to the MEOLUT, then [eq.5] may reflect an ambiguity or uncertainty of up to n*300 Km in the beacon position. Then, some or all of this ambiguity could be removed applying various criteria such as: technical (satellite position not aligned with the orbital elements; $C/N_0$ not matching the resolved elevation beacon antenna angle; Doppler: shift exceeding receiver BW), operational (ship cannot be on land), etc.

Clearly, further TOA measurements based on multiple bursts can provide additional equations, either in form of [eq.1] or in form of [eq.5], enabling improved localization accuracy.

The present invention can be also applied in case that a burst is relayed by two or more satellites.

Based on only TOA measurements of a single burst, with two satellites each mounted with a payload similar to said second payload, the remote receiver can resolve the beacon coordinates in 2D, based on two [eq.1] each corresponding to a different relaying satellite, and [eq.2].

Based on TOA plus FOA measurements of a single burst, with two satellites each mounted with a payload similar to said second payload, the remote receiver can resolve the beacon coordinates in 3D, based on two pairs of {[eq.1]+[eq.3]} each corresponding to one relaying satellite. As mentioned earlier, having 4 equations with 3 unknowns (x, y, z) enables reducing the resolved position error.

Actually, as a skilled person may already appreciate, the present invention can be applied with any number of bursts and any number of relaying satellites, enabling localization with fewer satellites in view compared to the present art, and improving, over present art solutions, the localization accuracy. In particular it enables fixing the 2D position of a beacon at a MEOLUT upon single burst transmission and single relaying satellite.

The present invention also discloses a radio beacon for localization via satellites, comprising: a receiver coupled to a transmitter; said receiver configured to record detection time of a first signal broadcast from a first satellite payload at a known epoch; said transmitter configured to transmit a second signal a predefined delay after said detection time, enabling a second satellite payload to relay said second signal to a remote receiver; and enabling at said remote receiver expressing the location coordinates of said beacon based on: said first and second satellite payloads position and said remote receiver position, said epoch, said predefined delay and the time at which said relayed second signal is detected at said remote receiver.

The three position measurements (first payload, second payload and remote receiver) and three time measurements (transmission of first signal, predefined delay at the beacon, and detection time at the remote receiver) enable expressing an equation with three unknowns—the beacon coordinates (x, y, z), wherein z can be assumed to be known in case of 2D. In order to resolve the 2D position, another (x, y) equation is required, which can be provided by an FOA measurement, as already described.

Then, the beacon according to the present invention enables 2D localization at a remote receiver upon a single burst transmission and single satellite mounted with both first and second payloads.

Preferably, said first signal is transmitted repeatedly at a fixed period and said radio beacon is configured to dynamically select at least one of said first signals detection time after which said second signal is transmitted, enabling said remote receiver to express the location coordinates of said beacon up to a certain ambiguity, even if said dynamic selection is unknown at the remote receiver. Practically this could be done by considering first signals that are GNSS signals, hence enable both the beacon and remote receiver referring to a common master clock—GPS TIME, which as a skilled person appreciates is synchronized to UTC, and practically administered at every GNSS satellite.

According to a preferred embodiment of the present invention, the beacon transmitter complies with Cospas-Sarsat specifications, embedded with a GNSS receiver; accordingly, said first satellite payload is a GNSS payload and said first signal is the GNSS signal modulated by the PRN and the navigation message, both periodic and synchronized to each other and to the GPS TIME (up to a small deviation specific to every satellite, which is reported by the satellite and can be accounted for); hence the known epoch can be the rising edge of a periodic clock derived from the PRN and navigation message timing, e.g. the GPS TIME 1 PPS, 1 KPPS, or synchronized thereto at a period of 0.5 s, 0.1 s, 0.05 s, or 0.01 s. The Cospas-Sarsat compatible transmitter is configured to emit periodic short bursts—the second signal, in the 406 MHz band, reporting a distress situation. Preferably, the second satellite payload is a SAR payload, configured to relay the beacon bursts back to the ground, where a remote receiver—MEOLUT, is configured to detect and localize the beacon. The predefined delay ($T_1$) is not necessarily fixed in advance; rather it may change from time to time or from beacon to beacon, in a way that is basically known to the MEOLUT, however not necessarily specifically. In other words, the MEOLUT does not necessarily have to know $T_1$, rather it can know the characteristics or pattern of this parameter such that it could resolve [eq.1] up to a tolerable ambiguity. For example, if we set $T_1$=n*ms, wherein n is a natural number that the MEOLUT does not specifically know, it can still localize the beacon up to an uncertainty of n*1 ms*C=n*300 Km, and further remove this ambiguity in various ways. For simplicity we can set $T_1$=0, i.e. the transmitter is prepared to send a burst as soon as it is triggered by the GNSS receiver.

If both first and second payloads are mounted on a same satellite, as practiced in the MEOSAR, the beacon localization is possible, according to the present invention, at least in 2D, upon a single burst transmission and single satellite, employing also FOA measurements.

The, the beacon according to the present invention could be configured to transmit two consecutive bursts, enabling the MEOLUT to determine its 2D location using TOA measurements, and 3D location using TOA+FOA measurements.

The beacon could also be configured to emit periodic bursts, with period of $T_2$=n*T, wherein n is a natural number and T is a fixed time period. For example, $T_2$=n*ms wherein n is chosen at the beacon and changed from time to time, even in a pseudorandom pattern to meet Cospas-Sarsat requirements for a pseudorandom time interval between bursts, and though the MEOLUT does not necessarily know the exact value of n, it can still resolve [eq.1] or [eq.5] up to a tolerable ambiguity.

Then, as soon as the beacon acquires 3 GNSS satellites or more, it can determine the exact GPS TIME and its internal GNSS receiver can generate the 1PPS and 1 KPPS clock. At this point it makes sense to configure the beacon to transmit further bursts synchronized with that 1PPS or 1 KPPS, i.e. in synchronization with UTC. As a skilled person probably appreciates, UTC—Universal Time Coordinated is synchronized to GNSS TIME, particularly GPS TIME, up to a known number of leap seconds.

The present invention further discloses a remote receiver (termed MEOLUT) for localization of radio beacons, comprising an RF module and a processor; said RF module configured to detect signals transmitted from satellites; said processor configured to express the coordinates of a beacon emitting signals relayed by satellites, based on: a time at which a first satellite payload transmits a first signal and position thereof; a predefined delay at which said beacon transmits a second signal after detecting said first signal; position of a second satellite payload relaying said second signal; detection time of said relayed second signal and position thereof.

Possibly, said first signal is transmitted repeatedly at a fixed period and said radio beacon dynamically selecting at least one of said first signals detection time after which said second signal is transmitted, said MEOLUT further configured to express the location coordinates of said beacon up to a certain ambiguity, even if said dynamic selection is unknown.

The MEOLUT can be further configured to remove this ambiguity based on additional information such as the satellite orbit, the satellite footprint, the relayed signal strength detected at the MEOLUT, the nature of the environment at the beacon location (e.g. sea), etc.

According to a preferred embodiment of the invention, said MEOLUT is a base station in the MEOSAR system of Cospas-Sarsat, configured to monitor navigation signals emitted by GNSS (Global Navigation Satellite System, sometimes also referred as GPS—Global Positioning System) satellites such as the US GPS, the European Galileo, the Russian Glonass or the Chinese BeiDou, and also monitor distress signals emitted by beacons and relayed by said GNSS satellites carrying also SAR payloads.

Accordingly, said MEOLUT is configured to acquire the UTC (Universal Coordinated Time) from said satellites, and generate an accurate clock synchronized with the UTC and with said first signal. According to the present invention, the beacon is configured to transmit a burst at a time instant associated with this clock, such that the MEOLUT could practically determine the beacon transmission time, as well as its position, upon fewer measurements than those practiced in present art systems.

This indirect synchronization of the beacon transmission time to a universal clock enables the MEOLUT to express the beacon location upon a single TOA measurement, i.e. compile an equation [eq.1] with only the beacon coordinates unknown based on a single TOA measurement.

Then, it is possible at the MEOLUT to resolve the beacon 2D location based on a single burst transmission and single satellite in view, considering another equation with these unknowns, based on FOA (Frequency of Arrival) measurements, as the latter is well practiced in the art.

Alternatively, if FOA is avoided (for example, as might be desired for a low cost and compact mobile MEOLUT, sometimes referred to as ROMEOLUT—Roaming Medium Earth Orbit Local User Terminal), two TOA measurements according to the present invention could be employed, by configuring the MEOLUT to detect another relayed second signal, wherein said another relayed second signal is due to another second signal transmitted by the beacon (two bursts, possibly relayed by single satellite) or the same second signal relayed by another satellite (single burst, two relaying satellites).

Obviously, upon additional bursts and/or additional satellites in view, further measurements could be employed at the MEOLUT to improve the beacon localization accuracy.

Other objects and advantages of the invention will become apparent as the description proceeds.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIG. 1 illustrates a present art concept for Beacon Localization based on TOA. Three Space Vehicles (satellites) SVi, i=1, 2, 3, are shown, at known positions $(x_i, y_i, z_i)$, each SV detecting at $tr_i$ a signal emitted at tx from a beacon at unknown (x, y, z) position. The TOA (Time of Arrival) measurement at each satellite defines a sphere on which the beacon should be placed, however for simplicity the picture depicts a circle, and these circles are shown to intersect at a unique point, at which the beacon is placed. At the bottom of the picture, the three navigation equations that describe this trilateration method are presented (C=the speed of light):

$$\sqrt{[(x-x_1)^2+(y-y_1)^2+(z-z_1)^2]}=C\times TOA_1=C\times(tr_1-tx)$$

$$\sqrt{[(x-x_2)^2+(y-y_2)^2+(z-z_2)^2]}=C\times TOA_2=C\times(tr_2-tx)$$

$$\sqrt{[(x-x_3)^2+(y-y_3)^2+(z-z_3)^2]}=C\times TOA_3=C\times(tr_3-tx)$$

FIG. 2 illustrates the present art concept of 2D Hyperbolic Localization based on TDOA. Three Space Vehicles SVi, i=1, 2, 3, are shown, at known positions $(x_i, y_i, z_i)$, each SV detecting at $tr_i$ a signal emitted from a beacon at unknown (x, y, z) position. The TDOA (Time Difference of Arrival) measurement of each pair of satellites defines a hyperbole (two sides symmetric over the y axis) on which the beacon should be placed, and two of these hyperboles are shown to intersect at a unique point, at which the beacon is placed. At the bottom of the picture, the two navigation equations that describe this method are presented (C=the speed of light):

$$\sqrt{[(x-x_1)^2+(y-y_1)^2]}-\sqrt{[(x-x_2)^2+(y-y_2)^2]}= C*TDOA_{12}=C*(tr_1-tr_2)$$

$$\sqrt{[(x-x_1)^2+(y-y_1)^2]}-\sqrt{[(x-x_3)^2(y-y_3)^2]}= C*TDOA_{13}=C*(tr_1-tr_3)$$

FIG. 3 illustrates a present art concept of Beacon Localization based on FOA. A single Space Vehicle SV₁ is shown, at a known position $(x_1, y_1, z_1)$ orbiting around the earth, at known velocity Vsat, detecting a Doppler shift $\Delta f$ of a signal emitted at frequency f, from a beacon at unknown (x, y, z) position. The angle $\alpha$ between the satellite movement direction and the beacon is defined by the Doppler equation at the bottom of the picture: (C=the speed of light):

$$Vsat*\cos(\alpha)/C=\Delta f/f$$

FIG. 4 illustrates TOA Measurement Synchronized with GPS Clock. The diagram at the upper part of the picture shows the transmitted beacon signal vs. GPS TIME and the diagram at the bottom part of the picture shows the detection of said beacon signal (relayed by a satellite, not shown) at the MEOLUT, again vs. same GPS TIME scale. Both the beacon and MEOLUT are shown to simultaneously detect the 1PPS pulse of the GPS, and the beacon is shown to transmit exactly at one of these 1 PPS instants. The MEOLUT detection time is referred to the last 1PPS pulse, and the time difference equals to the distance travelled between beacon and MEOLUT divided by the speed of light.

FIG. 5 illustrates a TOA Configuration According to Present Invention. Two satellites: SV₁ and SV₂ are shown, at known positions $(x_1, y_1, z_1)$ and $(x_1, y_1, z_1)$ respectively; a beacon marked by a triangle icon, shown at unknown position (x, y, z), and a MEOLUT (base station) marked by a trapeze icon placed at a known position $(x_m, y_m, z_m)$. SV₁ is shown to transmit a first signal detected at the beacon, the beacon is shown to transmit a second signal relayed by SV₂ and detected at the MEOLUT. A time scale shown below illustrates that the first signal is transmitted at $tx_e$, and $T_1$ after been detected at the beacon the second signal is transmitted, reaching the MEOLUT (via SV₂) at $tr_m$.

An equation printed at the bottom of the picture represents the TOA measurement related to the illustrated configuration; the left side of the equation represents the time at which the signals travel (and delayed) from SV₁ to the MEOLUT via the beacon and SV₂, these multiplied by the speed of light (C); the right side of the equation represents the total distance travelled based on the position coordinates of SV₁, SV₂, the beacon and the MEOLUT, according to the Pythagorean theorem:

$$C*[tr_m-tx_e-T_1]=S1+S2+S3=\sqrt{[(x-x_1)^2+(y-y_1)^2+(z-z_1)^2]}+\sqrt{[(x-x_2)^2+(y-y_2)+(z-z_2)^2]}+\sqrt{[(x_m-x_2)^2+(y_m-y_2)^2+(z_m-z_2)^2]}$$

FIG. 6 illustrates a TOA Measurement According to a 1ˢᵗ Embodiment of the Present Invention. Shown are two satellite payloads: GNSS and SAR, a beacon and a MEOLUT; the distance made by the first signal travelling between the GNSS satellite payload and the beacon is marked S1; the distance made by the second signal travelling between the beacon and the SAR satellite payload is marked S2; and the distance made by the relayed second signal travelling between the SAR satellite payload and the MEOLUT is marked S3. Further below, a horizontal time scale is depicted, showing the GPS TIME, in 1 ms steps. The rising edge of each 1 ms clock tick is marked by a short vertical line on said time scale and the rising edge of each 1 s clock tick is marked by a bit longer and thicker vertical line. On that time scale, the transmission time of the GNSS satellite payload is marked as $tx_e$, explicitly shown to be aligned with a 1 s GPS TIME clock tick, at N*sec wherein N is a natural number. Also on that time scale, the detection time at the MEOLUT is marked as $tr_m$, earlier than the (N+1)*sec clock tick; both $tr_m$ and N*sec are acquired and measured at the MEOLUT. Also on the time scale, the delay at the beacon between detection of first signal and transmission of second signal is marked $T_1$, and the delay at the SAR satellite payload in relaying the second signal is assumed zero.

The equation printed at the bottom of the picture expresses the TOA measurement:

$$C*[tr_m-tx_e-T_1]=S1+S2+S3$$

The above equation represents the non-ambiguous TOA calculation made at the MEOLUT, assuming that the MEOLUT can specifically determine: $tx_e$ and $tr_m$ and $T_1$.

FIG. 7 illustrates a TOA Measurement According to a 2ⁿᵈ Embodiment of the Present Invention. Shown are two satellite payloads: GNSS and SAR, a beacon and a MEOLUT; the distance made by the first signal travelling between the GNSS satellite payload and the beacon is marked S1; the distance made by the second signal travelling between the beacon and the SAR satellite payload is marked S2; and the distance made by the relayed second signal travelling between the SAR satellite payload and the MEOLUT is marked S3. Further below, a horizontal time scale is depicted, showing the GPS TIME, in 1 ms steps. The rising edge of each 1 ms clock tick is marked by a short vertical line on said time scale and the rising edge of each 1 s clock tick is marked by a bit longer and thicker vertical line. On that time scale, the transmission time of the GNSS satellite payload is marked as $tx_e$, explicitly shown to be aligned with a 1 s GPS TIME clock tick, at N*sec wherein N is a natural number. Also on that time scale, the detection time at the MEOLUT is marked as $tr_m$, earlier than the (N+1)*sec clock tick; both $tr_m$ and N*sec are acquired and measured at the MEOLUT. Also on the time scale, the delay at the beacon between detection of first signal and transmission of second signal is marked T1, wherein T1=n*ms and n is a natural number, and the delay at the SAR satellite payload in relaying the second signal is assumed zero.

The equation printed at the bottom of the picture expresses the TOA measurement:

$$C*(tr_m - tx_e - n*ms) = S1 + S2 + S3$$

The equation above represents an ambiguous TOA calculation made at the MEOLUT, assuming that the MEOLUT can determine $tx_e$ and $tr_m$, yet n is unknown.

FIG. 8 illustrates a TOA Measurement According to a 3$^{rd}$ Embodiment of the Present Invention. Shown are two satellite payloads: GNSS and SAR, a beacon and a MEOLUT; the distance made by the first signal travelling between the GNSS satellite payload and the beacon is marked S1; the distance made by the second signal travelling between the beacon and the SAR satellite payload is marked S2; and the distance made by the relayed second signal travelling between the SAR satellite payload and the MEOLUT is marked S3. Further below, a horizontal time scale is depicted, showing the GPS TIME, in 1 ms steps. The rising edge of each 1 ms clock tick is marked by a short vertical line on said time scale. On that time scale, the transmission time of the GNSS satellite payload is marked as $tx_e$, explicitly shown to be aligned with a 1 ms GPS TIME clock tick. Also on that time scale, the detection time at the MEOLUT is marked as $tr_m$, just after and next to a 1 ms tick of the GPS TIME clock, marked $(tx_e+n*ms)$ i.e. exactly n*ms after $tx_e$; both $tr_m$ and $(tx_e+n*ms)$ are acquired and measured at the MEOLUT (though n might be unknown). Also on the time scale, the delay at the beacon between detection of first signal and transmission of second signal is marked $T_1$, and the delay at the SAR satellite payload in relaying the second signal is assumed zero.

The equation printed at the bottom of the picture expresses the TOA measurement:

$$C*[tr_m - (tx_e + n*ms) + n*ms - T_1] = S1 + S2 + S3$$

The equation above represents another ambiguous TOA calculation made at the MEOLUT, assuming that the MEOLUT can determine $[tr_m - (tx_e + n*ms)]$, perhaps also $T_1$, yet n is unknown.

FIG. 9 illustrates the Beacon Block Diagram according to the present invention, comprising two main blocks: a GPS receiver and a UHF transmitter. The GPS receiver is depicted at the left upper part, coupled to a GPS (L-band) antenna, and providing 3 outputs: position (Lat/Lon) and two timing signals: the PRN correlation pulse and the 1 PPS/1 KPPS pulse.

The transmitter block is framed by a dashed line, comprising 5 sub blocks: TCXO (Temperature Compensated Crystal Oscillator), micro-processor, PSK modulator, Carrier frequency generator and power amplifier. The TCXO is the master clock of the beacon, generating a basic frequency of 12.68875 MHz which is multiplied or divided to generate the RF frequency of 406.040 MHz and bit rate of 400 bps for a standard 144 bits message communicated in every burst. The processor generates that message and controls the beacon timing. The PSK modulator transforms the digital bits to PSK (Phase Shift Keying) signals modulating the RF carrier, then amplified to 5 watts by the power amplifier and coupled to the UHF antenna. The PRN correlation pulse is routed to the PSK modulator via a $T_1$ delay block to show that it controls the timing of the PSK output, i.e. the timing of burst transmission, yet practically this can be done through the micro-processor, and the same applies to the 1 PPS/1 KPPS signal output from the GPS receiver.

FIG. 10 illustrates the MEOLUT Block Diagram according to COSPAS-SARSAT MEOLUT PERFORMANCE SPECIFICATION AND DESIGN GUIDELINES C/S T.019 Issue 1 Dec. 2015. The MEOLUT is divided to five main blocks: Antennas RF subsystems, Antenna management, Reception, Processing, and MEOLUT management; two external interfaces are also shown: to Networked MEOLUT(s) and to MCC.

DETAILED DESCRIPTION

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The present invention discloses a method for localization of a radio beacon at a remote receiver, via a first satellite payload and a second satellite payload, comprising the steps of:

a. Configuring said first satellite payload to broadcast a first signal at a known epoch;
b. Configuring said radio beacon to:
   Determine the detection time of said first signal;
   Transmit a second signal a predefined delay after said detection time;
c. Configuring said second satellite payload to relay said second signal;
d. Configuring said remote receiver to:
   Record the detection time of said relayed second signal, and said known epoch;
   Determine self-position, the position of said first satellite payload and the position of said second satellite payload;
   Enable expressing the location coordinates of said beacon based on said time records, said predefined delay, and said determined positions.

The disclosed method further comprises the steps of:

a. Configuring said first payload to periodically repeat said epoch and correspondingly said first signal transmissions at fixed time intervals;
b. Configuring said radio beacon to dynamically select at least one of said first signals detection time after which said second signal is transmitted;
c. Configuring said remote receiver to enable expressing the location coordinates of said beacon up to a certain ambiguity, even if said dynamic selection is unknown at the remote receiver.

FIG. 5 illustrates a TOA Configuration According to the Present Invention. Two satellites: $SV_1$ and $SV_2$ are shown, at known positions $(x_1, y_1, z_1)$ and $(x_1, y_1, z_1)$ respectively; assumable, a first payload is mounted on SV1 and a second payload mounted on SV2; a beacon marked by a triangle icon, shown at unknown position (x, y, z), and a MEOLUT (base station) marked by a trapeze icon placed at a known position $(x_m, y_m, z_m)$. $SV_1$ is shown to transmit a first signal detected at the beacon, the beacon is shown to transmit a second signal relayed by $SV_2$ and detected at the MEOLUT. A time scale shown below illustrates that the first signal is transmitted at $tx_e$ (said known epoch) and $T_1$ (said predefined delay) after been detected at the beacon the second signal is transmitted, reaching the MEOLUT (relayed by $SV_2$) at $tr_m$. An equation printed at the bottom of the picture, represents the TOA measurement related to the illustrated configuration; the left side of the equation represents the time at which the signals travel (and delayed) from $SV_1$ to the MEOLUT via the beacon and $SV_2$, these multiplied by the speed of light (C); the right side of the equation represents the total distance travelled based on the position coordinates of $SV_1$, $SV_2$, the beacon and the MEOLUT, according to the Pythagorean theorem. This equation already marked in the disclosure as [eq.1]:

$$C*[tr_m-tx_e-T_1]=S1+S2+S3=\sqrt{[(x-x_1)^2+(y-y_1)^2+(z-z_1)^2]}+\sqrt{(x-x_2)^2+(y-y_2)^2+(z-z_2)^2}+\sqrt{[(x_m-x_2)^2+(y_m-y_2)^2+(z_m-z_2)^2]}$$

As a skilled person may appreciate, [eq.1] expresses the location coordinates (x, y, z) of the beacon based on:
1. the time records $tr_m$ and $tx_e$
2. the predefined delay $(T_1)$
3. the determined positions of SV1 $(x_1, y_1, z_1)$, SV2 $(x_2, y_2, z_2)$, and the MEOLUT $(x_m, y_m, z_m)$.

The 3 positions can be determined based on present art methods. For example, navigation satellites constantly report their orbital parameters (elements), enabling remote receivers to determine the satellite position at any time with great accuracy. The MEOLUT position is obviously easy to determine with an embedded GNSS receiver.

The predefined delay $(T_1)$ employed by the beacon can be fixed and communicated to the MEOLUT in advance; It can even be configured to be zero.

The time records: $tr_m$ is measured at the MEOLUT, and $tx_e$ is also communicated to the MEOLUT, directly or preferably indirectly. The indirect way disclosed in the present invention is to refer, at both extreme sides of the combined communication link illustrated in FIG. 5, i.e. at SV1 and the MEOLUT, to a common global clock, which according to a preferred embodiment of the present invention is associated with the GPS TIME or UTC, and furthermore, agree upon discrete epochs at which the transmission may start. Such are for example the rising edge of the 1PPS or 1 KPPS of the GPS TIME clock, or clocks synchronized thereto.

According to a first embodiment of the present invention the first signal is transmitted exactly every 1 s. Further, the beacon is a Personal Locator Beacon (PLB) embedded with a GNSS receiver configured to detect said first signal by correlation with the GPS PRN spread spectrum sequence and detecting some bits of the navigation message, and transmit short bursts every 47.5-52.5 s according to the Cospas-Sarsat standard, to be relayed by SAR satellites and detected by a MEOLUT. Preferably, the satellite serving the beacon are mounted with both a GNSS and a SAR payload, as planned for the MEOSAR, and expected to be fully operational by 2018, based on DASS/GPS, SAR/Galileo and SAR/Glonass constellations. According to this first embodiment, the beacon, when detecting only 1-2 satellites, and is due to transmit a distress burst, transmits the burst exactly $T_1=0$ s after a successful PRN correlation associated with the rising edge of bit number 1+50n in any subframe of the navigation message, wherein n=0, 1, . . . 5. Since there are 300 bits per subframe transmitted at 50 bps, this means associating the burst timing with the 1 s epoch of the GNSS payload. When the MEOLUT detects the burst originally emitted by the beacon and relayed by the SAR satellite, it assumes that this burst was transmitted immediately upon detecting at the beacon the GNSS signal broadcast at the 1 s epoch. It is quite standard in Cospas-Sarsat to define the transmission time instant of a burst aligned with the rising edge of its $25^{th}$ message bit, which is the first information bit immediately after the synchronization frame, and so it is preferably configured here.

FIG. 6 illustrates a TOA Measurement According to a first Embodiment of the Present Invention. Shown are two satellite payloads: GNSS—broadcasting navigation signals, and SAR—"bent pipe" relay; a beacon and a MEOLUT; the distance made by the first signal travelling between the GNSS satellite payload and the beacon is marked S1; the distance made by the second signal travelling between the beacon and the SAR satellite payload is marked S2; and the distance made by the relayed second signal travelling between the SAR satellite payload and the MEOLUT is marked S3. Further below, a horizontal time scale is depicted, showing the GPS TIME, in 1 ms steps. The rising edge of each 1 ms clock tick is marked by a short vertical line on said time scale and the rising edge of the 1 s ticks is marked by a bit longer and thicker vertical line. On that time scale, the transmission time of the GNSS satellite payload is marked as $tx_e$, explicitly shown to be aligned with a 1 s GPS TIME clock tick, N*sec wherein N is a natural number. Also on that time scale, the detection time at the MEOLUT is marked as $tr_m$, earlier than a (N+1)*sec tick, which is logical since in 1 s the signal travels 300,000 Km and it is not likely to occur with satellites orbiting "just" 20,000 Km above the earth. Thus, both $tr_m$ and $tx_e$=N*sec are acquired and measured at the MEOLUT unambiguously. Also on that time scale, the delay at the beacon between detection of first signal and transmission of second signal is marked T1, and the delay at the SAR satellite payload in relaying the second signal is assumed to be zero.

The equation printed at the bottom of the picture expresses the TOA measurement:

$$C*[tr_m-tx_e-T_1]=S1+S2+S3; \text{ which is a variant of the already defined [eq.1].}$$

Since the MEOLUT can determine unambiguously $tr_m$ and $tx_e$=N*sec and $T_1$, the left side of [eq.1] is completely known, and the right side of that equation, as already discussed, includes the unknown (x, y, z) coordinates of the beacon, and the known coordinates of both satellites and the MEOLUT, so [eq.1], as claimed: Enable expressing the location coordinates of said beacon based on said time records, said predefined delay, and said determined positions.

According to a second embodiment of the present invention the first signal is transmitted exactly every 1 s. Further, the beacon is a Personal Locator Beacon (PLB) embedded with a GNSS receiver configured to detect said first signal by correlation with the GPS PRN spread spectrum sequence and detecting some bits of the navigation message, and transmit short bursts every 47.5-52.5 s, according to the Cospas-Sarsat standard, to be relayed by SAR satellites and detected by a MEOLUT. Preferably, the satellites serving the beacon are mounted with both a GNSS and a SAR payload. According to this second embodiment, the beacon, when detecting only 1-2 satellites, and is due to transmit a distress burst, transmits the burst exactly $T_1$=n*ms after a successful PRN correlation corresponding to the 1 s epoch, wherein n is a natural number and is selected so the time difference between consecutive bursts will be pseudo-random as required by Cospas-Sarsat specifications. When the MEOLUT detects the burst originally emitted by the beacon and relayed by the SAR satellite, it assumes that this burst was transmitted n*ms after the GPS TIME 1 s epoch was detected at the beacon, wherein n is a natural number yet specifically unknown at the MEOLUT.

FIG. 7 illustrates a TOA Measurement According to a $2^{nd}$ Embodiment of the Present Invention. Shown are two satellite payloads: GNSS and SAR, a beacon and a MEOLUT; the distance made by the first signal travelling between the GNSS satellite payload and the beacon is marked S1; the distance made by the second signal travelling between the beacon and the SAR satellite payload is marked S2; and the distance made by the relayed second signal travelling between the SAR satellite payload and the MEOLUT is marked S3. Further below, a horizontal time scale is depicted, showing the GPS TIME, in 1 ms steps. The rising edge of each 1 ms clock tick is marked by a short vertical line on said time scale and the rising edge of each 1 s clock tick is marked by a bit longer and thicker vertical line. On that time scale, the transmission time of the GNSS satellite payload is marked as $tx_e$, explicitly shown to be aligned with a 1 s GPS TIME clock tick, at N*sec wherein N is a natural number. Also on that time scale, the detection time at the MEOLUT is marked as $tr_m$, earlier than the (N+1)*sec clock tick; both $tr_m$ and N*sec are acquired and measured at the MEOLUT. Also on the time scale, the delay at the beacon between detection of first signal and transmission of second signal is marked $T_1$, wherein $T_1$=n*ms and n is a natural number, and the delay at the SAR satellite payload in relaying the second signal is assumed zero.

The equation printed at the bottom of the picture expresses the TOA measurement:

$C*(tr_m-tx_e-n*ms)=S1+S2+S3$; which is also a variant of the already defined [eq.1].

As in the first embodiment, the right side of that equation includes the unknown (x, y, z) coordinates of the beacon, and the known coordinates of both satellites and the MEOLUT. Regarding the left side of the equation, the MEOLUT can determine $tr_m$ and $tx_e$=N*sec, however not n (at least on first iteration). At this point the MEOLUT may assess the value of n, for example assuming that S1+S2+S3=3*(average distance between satellite and earth surface), which is about 3*20,000 Km for GNSS satellites, and select the closest n which satisfies [eq.1] under that assumption; further, other values on n could be tried and reject those that are in contrast with system parameters or measurements or operational conditions, such as the satellite orbit, satellite footprint, the detected $C/N_0$, etc. So finally, it could be possible to determine n at the MEOLUT, hence n could be also serve as a parameter communicated from the beacon to the MEOLUT, e.g. encoding the ID of the first payload satellite, i.e. the GNSS satellite to which the beacon burst was synchronized. Obviously, the MEOLUT can use this information to compile [eq.1].

According to a third embodiment of the present invention the first signal is transmitted exactly every 1 ms. Further, the beacon is a Personal Locator Beacon (PLB) embedded with a GNSS receiver configured to detect said first signal by correlation with the GPS PRN spread spectrum sequence, and transmit short bursts every 47.5-52.5 s, according to the Cospas-Sarsat standard, to be relayed by SAR satellites and detected by a MEOLUT. Preferably, satellites serving the beacon are mounted with both a GNSS and a SAR payload.

According to this third embodiment, the beacon, when detecting only 1-2 satellites, and is due to transmit a distress burst, transmits the burst exactly $T_1$ after a successful PRN correlation. When the MEOLUT detects the burst originally emitted by the beacon and relayed by the SAR satellite, it assumes that this burst is associated with a GPS 1 ms epoch, though the specific 1 ms epoch is unknown at the MEOLUT.

FIG. 8 illustrates a TOA Measurement According to a $3^{rd}$ Embodiment of the Present Invention. Shown are two satellite payloads: GNSS and SAR, a beacon and a MEOLUT and the distances S1, S2, S3 as described above. Further below, a horizontal time scale is depicted, showing the GPS TIME, in 1 ms steps. The rising edge of each 1 ms clock tick is marked by a short vertical line on said time scale. On that time scale, the transmission time of the GNSS satellite payload is marked as $tx_e$, explicitly shown to be aligned with a 1 ms GPS TIME clock tick. Also on that time scale, the detection time at the MEOLUT is marked as $tr_m$, just after and next to a 1 ms tick of the GPS TIME clock, marked $(tx_e+n*ms)$ i.e. exactly n*ms after $tx_e$; both $tr_m$ and $(tx_e+n*ms)$ are acquired and measured at the MEOLUT (though n is not necessarily known). Also on the time scale, the delay at the beacon between detection of first signal and transmission of second signal is marked T1, and the delay at the SAR satellite payload in relaying the second signal is assumed zero.

The equation printed at the bottom of the picture expresses the TOA measurement:

$C*[tr_m-(tx_e+n*ms)+n*ms-T_1]=S1+S2+S3$

As in the second embodiment, the right side of that equation includes the unknown (x, y, z) coordinates of the beacon, and the known coordinates of both satellites and the MEOLUT. Regarding the left side of the equation, the MEOLUT can determine $[tr_m-(tx_e+n*ms)]$, however not n. Similarly to the second embodiment, the MEOLUT may assess the value of n, and reject those that are in contrast with some system parameters or measurements or operational conditions.

Further according to said first, second and third embodiments of the present invention, the MEOLUT configured to detect the frequency of arrival (FOA) of the relayed beacon bursts, determine the beacon transmission frequency and resolve the beacon coordinates at least in 2D. As already described, the combination of [eq.1]+[eq.2]+[eq.3] enable 2D localization upon a single burst and single satellite (mounted with both GNSS and SAR payloads).

Obviously, if two SAR satellites are in common view by both the beacon and MEOLUT, and the MEOLUT detects a beacon burst relayed by those two satellites, then two independent [eq.1] can be composed at the MEOLUT, enabling 2D localization by 2*[eq.1]+[eq.2], or 3D localization by 2*[eq.1]+2*[eq.3], the latter with improved accuracy due to redundant measurements.

Additionally according to said first, second and third embodiments of the present invention, when the beacon detects 3 or more GNSS satellites, resolves the navigation equations and acquires the precise GPS TIME, i.e. the 1PPS signal, the beacon is configured to transmit further bursts in synchronization with UTC. As appreciated by a skilled person, UTC and GPT TIME are synchronized to same rising edge of the seconds tick.

FIG. 4 illustrates TOA Measurement Synchronized with GPS Clock. The diagram at the upper part of the picture shows the transmitted beacon signal vs. GPS TIME and the diagram at the bottom part of the picture shows the detection of said beacon signal (relayed by a satellite, as shown in FIG. 5) at the MEOLUT, again vs. same GPS TIME scale. Both the beacon and MEOLUT are shown to simultaneously detect the 1PPS pulse of the GPS, and the beacon is shown to transmit exactly at one of these 1PPS instants. The MEOLUT detection time is referred to the last 1PPS pulse, and the time difference equals to the distance travelled between beacon and MEOLUT divided by the speed of light.

The present invention discloses also a radio beacon for localization via satellites, comprising: a receiver coupled to a transmitter; said receiver configured to record detection time of a first signal broadcast from a first satellite payload at a known epoch; said transmitter configured to transmit a second signal a predefined delay after said detection time, enabling a second satellite payload to relay said second signal to a remote receiver; and enabling at said remote receiver expressing the location coordinates of said beacon based on: said first and second satellite payloads position and said remote receiver position, said epoch, said predefined delay and the time at which said relayed second signal is detected at said remote receiver.

FIG. 9 illustrates the Beacon Block Diagram according to the present invention, comprising two main blocks: a GPS receiver and a UHF transmitter. The GPS receiver is depicted at the left upper part, coupled to a GPS (L-band) antenna, and providing 3 outputs: position (Lat/Lon) and two timing signals: the PRN correlation pulse and the 1 PPS/1 KPPS pulse, possibly configurable on the same terminal. There are many GPS receivers in the market in form of components/modules/chip-sets that could be embedded in the beacon, as the skilled person appreciates, which commonly output the position and 1 PPS/1 KPPS data. Yet, the PRN correlation pulse is not a standard output in the industry, though typically is internally generated, and might be configured as an output in certain platforms such as software GNSS receivers.

The transmitter block is framed by a dashed line, comprising 5 sub blocks: TCXO (Temperature Compensated Crystal Oscillator), micro-processor, PSK modulator, RF (Carrier frequency) generator and power amplifier. The TCXO is the master clock of the beacon, generating a basic frequency of 12.68875 MHz which is multiplied or divided to generate the RF frequency of 406.040 MHz and bit rate of 400 bps to clock the standard 144 bits message communicated in every burst. The processor generates that message and controls the beacon timing. The PSK modulator transforms the digital bits to PSK (Phase Shift Keying) signals modulating the RF carrier, amplified to 5 watts by the power amplifier and coupled to the UHF antenna. The PRN correlation pulse is routed to the PSK modulator via a $T_1$ delay block to show that it controls the timing of the PSK output, i.e. timing of burst transmission, yet practically this can be done through the micro-processor, and the same applies to the 1 PPS/1 KPPS signal output from the GPS receiver. In some receivers, such as u-blox M8M, there is a general time pulse output port that can be configured to 1 PPS, 1 KPPS and likewise.

The transmitter sub-blocks (micro-processor, modulator, RF generator, power amplifier and TCXO) can be implemented with off the shelf components, known to those skilled in the art. The processor, which typically comprises also RAM, EPROM and peripherals, sometimes referred to as micro-controller, runs a dedicated real time software, such that is well practiced in the art.

According to a fourth embodiment of the present invention, the beacon is a Maritime Survivor Location Device (MSLD), in form of a wrist watch, particularly addressing Man over Board (MOB) situations. The beacon, designed following the block diagram presented in FIG. 9, is activated upon falling overboard, either manually or triggered by water sensing or impact sensing devices embedded in the beacon. Upon activation, the GPS receiver is turned on, searching for GPS satellites, and the processor is prepared to broadcast periodic bursts indicating the distress situation and parameters. These parameters typically include a unique ID and the position as acquired at the beacon by an embedded GNSS receiver. Since the GPS receiver is typically turned on in "cold start", i.e. with no valid position and time, it can take up to 30-40 seconds of continuously monitoring some satellites until the position is fixed, and this could be very problematic if the device antenna drastically changes its orientation and immersed in the water from time to time, as expected from a wrist-worn device in such situation. Nevertheless, a single GPS satellite might be momentarily detected, since it requires less than a second to acquire the PRN which is continuously broadcast by every GPS satellite, repeatedly every 1 ms. Then, the GPS receiver outputs the PRN correlation pulse, monitored by the processor which accordingly configures the timing of the next burst.

Further according to this fourth embodiment, said first signal, i.e. the GNSS signal, is transmitted repeatedly at a substantially fixed period, and said radio beacon configured to dynamically select at least one of said first signals detection time after which said second signal is transmitted, enabling a remote receiver to express the location coordinates of the MSLD up to a certain ambiguity, even if said dynamic selection is unknown at the remote receiver. As appreciated by those skilled in the art, the GNSS signals comprise a PRN sequence that is repeatedly transmitted every 1 ms, and a navigation message structured with frames divided to subframes and further divided to words; each subframe transmitted every 6 s, aligned with the PRN timing; each subframe beginning with a Telemetry Word (TLM), enabling the receiver to detect the beginning of a subframe and determine the GNSS receiver clock time at which the navigation subframe begins; next is the handover word (HOW), specifying the time at which the first bit of the next subframe will be transmitted. Each of the TLM and HOW words contain 30 bits, each bit transmitted at 50 bps, also aligned with the PRN timing. This information can be used by the MSLD, embedded with a GNSS receiver, to generate a local replica of the satellite clock, though not at the same phase, but at any desired rate, as a reference to the GNSS epoch.

At the remote receiver a same rate clock can be configured, this synchronized with the satellite clock, enabling using [eq.1]. If this clock rate is relatively high, e.g. 1 KPPS, the remote receiver cannot clearly determine at which phase of that clock the first signal was transmitted, so [eq.1] could be resolved just up to a certain ambiguity.

Considering that ambiguity, this enables the remote receiver expressing the location coordinates of the beacon based on a TOA measurement according to the present invention, and further determine the beacon location based on further TOA and/or FOA measurements, according to the above expressed [eq.1], [eq.2], [eq.3] and [eq.5]. In particular, the beacon enables localization by a remote receiver upon a single burst transmission and single satellite in view.

Further bursts emitted by the beacon, and/or additional satellites in view relaying these bursts, enable reducing the localization error.

The present invention further discloses a MEOLUT for localization of radio beacons, comprising an RF module and a processor; said RF module configured to detect signals transmitted from satellites; said processor configured to express the coordinates of a beacon emitting signals relayed by satellites, based on: a time at which a first satellite payload transmits a first signal and position thereof; a predefined delay at which said beacon transmits a second signal after detecting said first signal; position of a second satellite payload relaying said second signal; detection time of said relayed second signal and position thereof.

FIG. 10 illustrates the MEOLUT Block Diagram according to COSPAS-SARSAT MEOLUT PERFORMANCE SPECIFICATION AND DESIGN GUIDELINES C/S T.019 Issue 1 Dec. 2015. The MEOLUT is divided to five main blocks: Antennas RF subsystems, Antenna management, Reception, Processing, and MEOLUT management; two external interfaces are also shown: to Networked MEOLUT(s) and to MCC.

The Antennas RF subsystems module is responsible to detect the satellite signals, both GNSS and SAR relayed signals, and the Antenna management module controls the operation thereof; the Reception module gets the weak and noisy RF signals detected at the Antennas and preprocesses the signals typically through amplification, filtering, mixing, sampling, digitizing and so on, to a level and format manageable by the Processing module; at the Processing module the TOA and FOA measurements are employed, as well as the beacon localization, controlled by the MEOLUT management module; the beacons localization results, and complementary data are reported to the MCC (Mission Control Centre); optionally, raw measurement data is reported to and received from other MEOLUTs in order to enhance the localization performance.

Typically, the Processing module will be responsible to express the beacon coordinates and resolve the beacon position based on TOA and FOA measurements according to the present invention. Preferably, most of these tasks are performed in software, on a powerful processor, running at high speed and using large RAM and ROM space.

According to a fifth embodiment of the present invention, the MEOLUT is actually a ROMEOLUT—Roaming MEOLUT, i.e. mobile remote receiver, for tracking beacons on the move from aircraft, ships, terrestrial vehicles and even carried by persons, in search and rescue operations. The ROMEOLUT according to this fifth embodiment of the present invention is based on a sub-set of the blocks depicted in FIG. 10: Antennas RF subsystems, Reception and Processing; the Antennas RF subsystems and the Reception module are configured to detect the GNSS satellite signals, but SAR signals directly from the beacon, i.e. directly detect the second signal (not the relayed); preferably, two separate antennas are used: an L-band GNSS antenna and a UHF antenna, and two receivers: a GNSS receiver and a UHF PSK receiver, the latter could be implemented based on one of Analog Devices: ADRF6850 (100 MHz to 1000 MHz Integrated Broadband Receiver) or ADRF6806 (50 MHz to 525 MHz Quadrature Demodulator with Fractional-N PLL and VCO).

The Processing module could be implemented based on, for example, a Texas Instruments MSP430 controller, possibly with on an ARM core, to run the TOA and FOA measurements, as well as the beacon localization; since the ROMEOLUT is configured to directly detect the beacon bursts (second signals) the second satellite payload is redundant and in [eq.1] and [eq.5] the position coordinates of the second payload satellite are united with the coordinates of the beacon. This version of [eq.1] relevant to the fifth embodiment is therefore:

$$C^*(tr_m - tx_e - T_1) = \sqrt{[(x-x_1)^2 + (y-y_1)^2 + (z-z_1)^2]} + \sqrt{[(x_m-x)^2 + (y_m-y)^2 + (z_m-z)^2]}; \quad [\text{eq.6}]$$

Further according to the fifth embodiment, the first signal is a GNSS signal transmitted repeatedly at a fixed period, and the beacon dynamically selects some of said GNSS signals detection time after which a burst is transmitted, then the ROMEOLUT is further configured to express the location coordinates of the beacon up to a certain ambiguity, even if said dynamic selection is unknown. Naturally, since the ROMEOLUT is configured to detect the beacon bursts directly, the typical operation range of the ROMEOLUT is much shorter compared to a standard MEOLUT served by SAR satellites, thus the ambiguity in [eq.6] due to miss interpretation of $tx_e$ and/or $T_1$ at the ROMEOLUT can be removed much easier.

The true scope the present invention is not limited to the presently preferred embodiments disclosed herein. For example, the foregoing disclosure uses explanatory terms, such as GPS, GNSS as well as radio beacon, MEOLUT, and the Cospas-Sarsat system, which should not be construed so as to limit the scope of protection of the claims, or to otherwise imply that the inventive aspects of the disclosed methods and devices are limited to the particular methods and apparatus disclosed.

In many cases, the place of implementation described herein is merely a designer's preference and not a hard requirement. For example, functions disclosed as implemented at the detecting device may alternatively be partially implemented at satellite payloads, or vice versa. Also, functions or blocks described as implemented in hardware might be alternatively implemented in software, or vice versa. Given the rapidly declining cost of digital signal processing and other processing functions, it is easily possible, for example, to transfer the processing or a particular function from one of the functional elements described herein to another functional element without changing the inventive operation of the system.

The invention claimed is:

1. A method for localization of a radio beacon at a remote receiver, via a first satellite payload and a second satellite payload, comprising the steps of:
   Configuring said first satellite payload to broadcast a first signal at a known epoch ($tx_e$), then periodically repeat first signal transmissions at fixed time intervals;
   Configuring said radio beacon to detect and dynamically select at least one of said first signals and transmit a second signal a predefined delay ($T_1$) after detecting said first signal;
   Enabling a second satellite payload to relay said second signal to said remote receiver;
   Configuring said remote receiver to determine the location coordinates of said beacon (x, y, z) up to a certain ambiguity, even without knowing said dynamic selection, based on: said first ($x_1$, $y_1$, $z_1$) and second ($x_2$, $y_2$, $z_2$) satellite payloads position and said remote receiver position ($x_m$, $y_m$, $z_m$), and a difference between time at which said relayed second signal is detected at said remote receiver ($tr_m$) and time at which the first satellite payload transmits the first signal ($tx_e$), accounting for said predefined delay ($T_1$).

2. The method according to claim 1, further removing at least part of said ambiguity by information acquired or considered at said remote receiver.

3. The method according to claim 1, wherein said first and second satellite payloads are mounted on same satellite.

4. The method according to claim 1, further configuring said remote receiver to:
   a. Detect and record the frequency of arrival (FOA) of said relayed second signal;
   b. Determine the beacon transmission frequency;

c. Resolve the beacon coordinates at least in two dimensions (2D).

5. The method according to claim 1, configuring said beacon to transmit said second signal at least twice, and configuring said remote receiver to resolve the beacon coordinates at least in 2D.

6. The method according to claim 1, wherein at least two satellites carry a payload as said second payload, and said remote receiver to resolve the beacon coordinates at least in 2D.

7. A radio beacon for localization via satellites, comprising: a receiver coupled to a transmitter; said receiver configured to detect and dynamically select at least one of first signals broadcast by a first satellite payload at a known epoch ($tx_e$) and periodically afterwards at fixed time intervals, and said transmitter configured to transmit a second signal a predefined delay ($T_1$) after detecting said first signal; enabling a second satellite payload to relay said second signal to a remote receiver; and enabling a remote receiver to determine the location coordinates of said beacon (x, y, z) up to a certain ambiguity, even without knowing said dynamic selection, based on: said first ($x_1$, $y_1$, $z_1$) and second ($x_2$, $y_2$, $z_2$) satellite payloads position and said remote receiver position ($x_m$, $y_m$, $z_m$), and a difference between time at which said relayed second signal is detected at said remote receiver ($tr_m$) and time at which the first satellite payload transmits the first signal ($tx_e$), accounting for said predefined delay ($T_1$).

8. The beacon according to claim 7, enabling its localization at said remote receiver at least in two dimensions (2D), upon a single second signal burst transmission, a single satellite carrying both first and second payloads, and a further Frequency of Arrival (FOA) measurement of said relayed second signal.

9. The beacon according to claim 7, wherein said receiver is a Global Navigation Satellite System (GNSS) receiver and said epoch is synchronized with said first satellite payload clock.

10. The beacon according to claim 7, further configured to transmit said second signal at least twice, enabling said remote receiver determining the location coordinates of said beacon at least in 2D.

11. The beacon according to claim 7, configured to transmit further signals similar to said second signal, wherein the transmission time of said further signals is substantially synchronized with Universal Time Coordinated (UTC).

12. A Medium Earth Orbit Local User Terminal (MEOLUT) for localization of radio beacons, comprising an RF module and a processor; said RF module configured to detect signals transmitted from satellites and said processor configured to determine the position of radio beacons; wherein a first satellite payload is configured to broadcast a first signal at a known epoch ($tx_e$) and periodically afterwards at fixed time intervals; and a beacon configured to detect and dynamically select at least one of said first signals and transmit a second signal a predefined delay ($T_1$) after detecting said first signal; a second satellite payload relaying said second signal to the MEOLUT; and said MEOLUT configured to determine the coordinates (x, y, z) of said beacon up to a certain ambiguity, even without knowing said beacon dynamic selection, based on: said first ($x_1$, $y_1$, $z_1$) and second ($x_2$, $y_2$, $z_2$) satellite payloads position and said MEOLUT position ($x_m$, $y_m$, $z_m$), and a difference between time at which said relayed second signal is detected at the MEOLUT ($tr_m$) and time at which the first satellite payload transmits the first signal ($tx_e$), accounting for said predefined delay ($T_1$).

13. The MEOLUT according to claim 12, further configured to remove at least part of said ambiguity based on additional information.

14. The MEOLUT according to claim 12, further configured to determine the frequency of arrival (FOA) of said relayed second signal, determine the beacon transmission frequency, and resolve the beacon coordinates at least in two dimensions (2D).

15. The MEOLUT according to claim 12, configured to determine the beacon coordinates at least in 2D, upon a single second signal burst transmission and a single satellite carrying both first and second payloads.

16. The MEOLUT according to claim 12, further configured to detect at least another relayed second signal, and resolve the beacon coordinates at least in 2D.

17. The MEOLUT according to claim 12, further configured to detect said second signal relayed by at least two satellites, and resolve the beacon coordinates at least in 2D.

18. A Global Navigation Satellite System (GNSS) receiver configured to be coupled to a transmitter for remote time synchronization; said receiver configured to detect first signals broadcast by a first satellite payload at a known epoch ($tx_e$) and periodically afterwards at fixed time intervals, enabling said coupled transmitter to dynamically select at least one of said first signals and transmit a second signal a predefined delay ($T_1$) after detecting said first signal; wherein a second satellite payload enabled to relay said second signal to a remote receiver; and enabling a remote receiver determining the transmission time of said second signal up to a certain ambiguity, even without knowing said dynamic selection, based on: said first ($x_1$, $y_1$, $z_1$) and second ($x_2$, $y_2$, $z_2$) satellite payloads position and said remote receiver position ($x_m$, $y_m$, $z_m$), and a difference between time at which said relayed second signal is detected at said remote receiver ($tr_m$) and time at which the first satellite payload transmits the first signal ($tx_e$), accounting for said predefined delay ($T_1$).

19. The GNSS receiver according to claim 18, comprising an I/O terminal coupled to the transmitter, said terminal configured to indicate detection time of said first signal or the GNSS clock or the Universal Time Coordinated (UTC).

20. The GNSS receiver according to claim 18, enabling said remote receiver determining the location of said transmitter based on the calculated transmission time of said second signal.

* * * * *